(12) United States Patent
Lyle

(10) Patent No.: US 12,530,480 B2
(45) Date of Patent: Jan. 20, 2026

(54) ROLE-BASED LARGE LANGUAGE MODEL TO ENABLE SECURITY AND ACCURACY

(71) Applicant: NVIDIA Corporation, Santa Clara, CA (US)

(72) Inventor: Ruthie D. Lyle, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 142 days.

(21) Appl. No.: 18/497,946

(22) Filed: Oct. 30, 2023

(65) Prior Publication Data

US 2024/0378306 A1  Nov. 14, 2024

Related U.S. Application Data

(60) Provisional application No. 63/500,872, filed on May 8, 2023.

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC .. G06F 21/6218; G06F 21/6245; G06N 20/00
See application file for complete search history.

(56) References Cited

U.S. PATENT DOCUMENTS

| | | | |
|---|---|---|---|
| 9,864,949 B1 * | 1/2018 | Astiagarraga | G06N 3/006 |
| 11,194,973 B1 * | 12/2021 | Goel | G06N 3/08 |
| 11,568,861 B2 | 1/2023 | Das et al. | |
| 11,651,256 B1 * | 5/2023 | Beechinor | G06F 40/40 |
| | | | 704/9 |
| 12,001,580 B1 * | 6/2024 | Thummala | G06F 21/6227 |
| 2005/0288935 A1 * | 12/2005 | Lee | G10L 15/26 |
| | | | 704/E15.045 |
| 2012/0078891 A1 * | 3/2012 | Brown | G06F 16/3329 |
| | | | 707/723 |
| 2015/0088484 A1 * | 3/2015 | Bostick | G06F 40/40 |
| | | | 704/2 |

(Continued)

FOREIGN PATENT DOCUMENTS

| | | | | |
|---|---|---|---|---|
| CN | 112100350 A | * | 12/2002 | ....... G06F 16/33229 |
| CN | 108763495 A | * | 11/2018 | |

(Continued)

*Primary Examiner* — John B King
(74) *Attorney, Agent, or Firm* — Lowenstein Sandler LLP

(57) ABSTRACT

A first query having a first privacy status is received. A response to the first query is obtained based on output(s) of one or more machine learning (ML) models of an open domain dialog system. Each ML model is trained to predict responses to queries having the first privacy status. Data associated with the first query and the response is provided as training data for the ML models, in view of the first privacy status. A second query having a second privacy status is received. A closed domain dialog system associated with a context of the second query and having a privacy status corresponding to the second privacy status is identified. The second query is forwarded to the closed domain dialog system for obtaining a response to the second query. Data associated with the second query is not provided to train the ML models of the open domain dialog system.

20 Claims, 17 Drawing Sheets

(56) References Cited

U.S. PATENT DOCUMENTS

| | | | |
|---|---|---|---|
| 2016/0253596 A1* | 9/2016 | Goth, III | G09B 7/02 706/12 |
| 2017/0364593 A1* | 12/2017 | Busey | G06N 5/02 |
| 2018/0158457 A1* | 6/2018 | Tanaka | G06F 16/9535 |
| 2018/0196796 A1* | 7/2018 | Wu | G06F 40/289 |
| 2018/0314959 A1* | 11/2018 | Apokatanidis | G06N 5/04 |
| 2018/0357240 A1* | 12/2018 | Miller | G06N 5/022 |
| 2019/0171726 A1* | 6/2019 | Ahmed | G06F 16/9535 |
| 2019/0347668 A1* | 11/2019 | Williams | G06F 18/2413 |
| 2020/0125568 A1* | 4/2020 | Idicula | G06N 20/20 |
| 2020/0134090 A1* | 4/2020 | Mankovskii | G06V 10/762 |
| 2020/0395000 A1* | 12/2020 | Chu | G06F 16/3329 |
| 2021/0021631 A1* | 1/2021 | Okutan | H04L 63/164 |
| 2021/0027770 A1* | 1/2021 | Olabiyi | G06N 3/045 |
| 2021/0224858 A1* | 7/2021 | Khoury | G06Q 30/0276 |
| 2021/0319069 A1* | 10/2021 | Cui | G06N 3/044 |
| 2021/0342399 A1* | 11/2021 | Sisto | G06F 16/90332 |
| 2022/0253611 A1* | 8/2022 | Galitsky | G06F 16/3329 |
| 2022/0269713 A1* | 8/2022 | Wang | G06F 16/345 |
| 2022/0300716 A1* | 9/2022 | Sabharwal | G06F 16/24578 |
| 2023/0145208 A1* | 5/2023 | Bobu | G06N 20/00 706/12 |
| 2023/0161972 A1* | 5/2023 | Härmä | G06F 40/56 704/9 |

FOREIGN PATENT DOCUMENTS

| | | | | |
|---|---|---|---|---|
| CN | 110489536 A | * | 11/2019 | ......... G06F 16/3329 |
| CN | 113312470 A | * | 8/2021 | ........... G06F 16/335 |
| CN | 113946672 A | * | 1/2022 | |
| CN | 115098666 A | * | 9/2022 | |
| CN | 115858756 A | * | 3/2023 | |
| CN | 118061214 A | * | 5/2024 | |
| EP | 2548138 B1 | * | 9/2018 | ......... G06F 21/6227 |
| EP | 3945444 A1 | * | 2/2022 | ......... G06Q 30/0629 |
| WO | WO-2006087429 A1 | | 8/2006 | ............ H04L 12/66 |
| WO | WO-2016200461 A2 | * | 12/2016 | ........... G06F 21/602 |
| WO | WO-2021237082 A1 | * | 11/2021 | |
| WO | WO-2022174161 A1 | * | 8/2022 | ............. A61B 5/165 |

\* cited by examiner

EXAMPLE DIALOG:

QUERY 1: "I'd like to create a digital avatar with the ability to translate between English and Spanish. What are the steps and how much would it cost me if I expect no more than 200 requests per day?" ⌒702

RESPONSE 1: "Sure, I can help you with that. To build a digital human, do XYZ. The cost will be $XX.XX for 200 requests a day which depends on the platform used to provide the digital avatar. Is there anything else that I could help you with?" ⌒704

QUERY 2: "Are there any medical best practices that I should incorporate if my avatar needs to engage with someone who is speech impaired or hearing impaired?" ⌒706

RESPONSE 2: "Yes, for people that are speech impaired, do XYZ. For people that are hearing impaired, do XYZ." ⌒708

FIG. 7

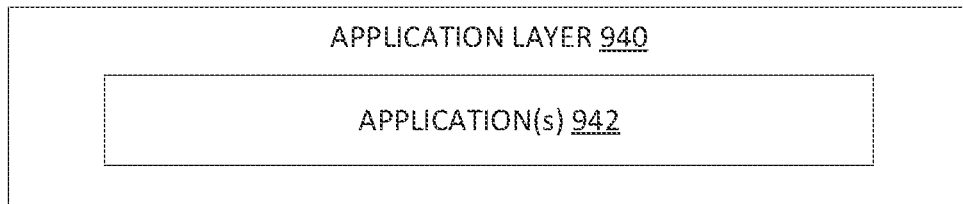
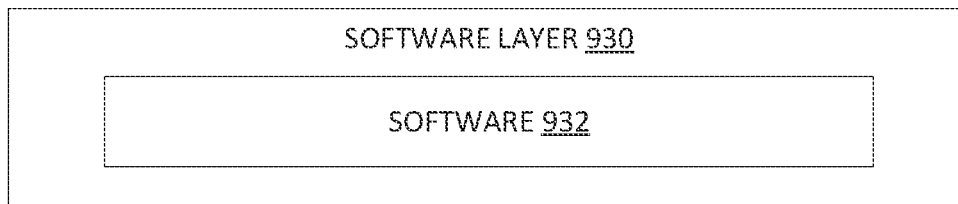
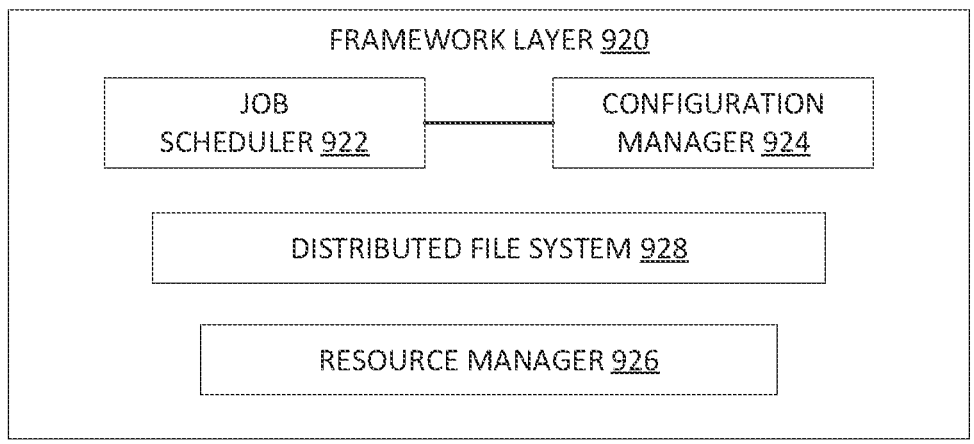
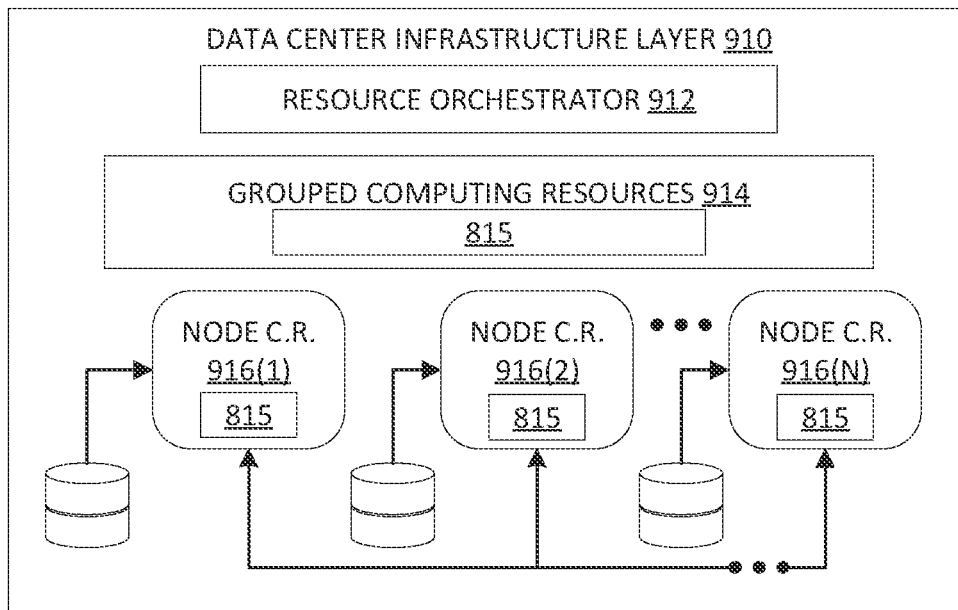
FIG. 9

ROLE-BASED LARGE LANGUAGE MODEL TO ENABLE SECURITY AND ACCURACY

RELATED APPLICATIONS

This application is a continuation of U.S. Patent Application No. 63/500,872, filed May 8, 2023, the entire contents of which is hereby incorporated by reference herein.

TECHNICAL FIELD

At least one embodiment pertains to large language models and, more specifically, to a role-based large language model (LLM) to enable security and accuracy. For example, user queries associated with a first privacy status can be handled by one or more LLMs of an open domain dialog system. User queries associated with a second privacy status can be handled by one or more LLMs of a closed domain dialog system.

BACKGROUND

Some applications provide features pertaining to text-based conversations, answering questions, providing information, generating human-like text, and assisting with a wide range of tasks for a user. Such software applications may be supported by large language model (LLM), which are used by the software applications to provide users with access to such features. A LLM refers to a type of artificial intelligence trained or otherwise designed to understand queries provided according to a natural language of a user and generate or otherwise provide a human-like response to the queries based on patterns and information it has learned from vast amounts of data. Some LLMs have been initially trained using a significantly large training data set (e.g., including millions or billions of data items) relating to a large number of topics. LLMs may be continuously re-trained based on user-provided queries and corresponding responses, so to improve an accuracy of future responses of the LLMs. Some users may not want to access application features supported by LLMs to perform certain tasks, as they are concerned that confidential or otherwise sensitive data needed to perform the tasks will be used to re-train the LLMs, and such data may be made available to other users (e.g., inadvertently).

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 7 depicts example dialog exchanges, according to at least one embodiment;

FIG. 9 illustrates an example data center system, according to at least one embodiment;

DETAILED DESCRIPTION OF EMBODIMENTS

Figure 1:
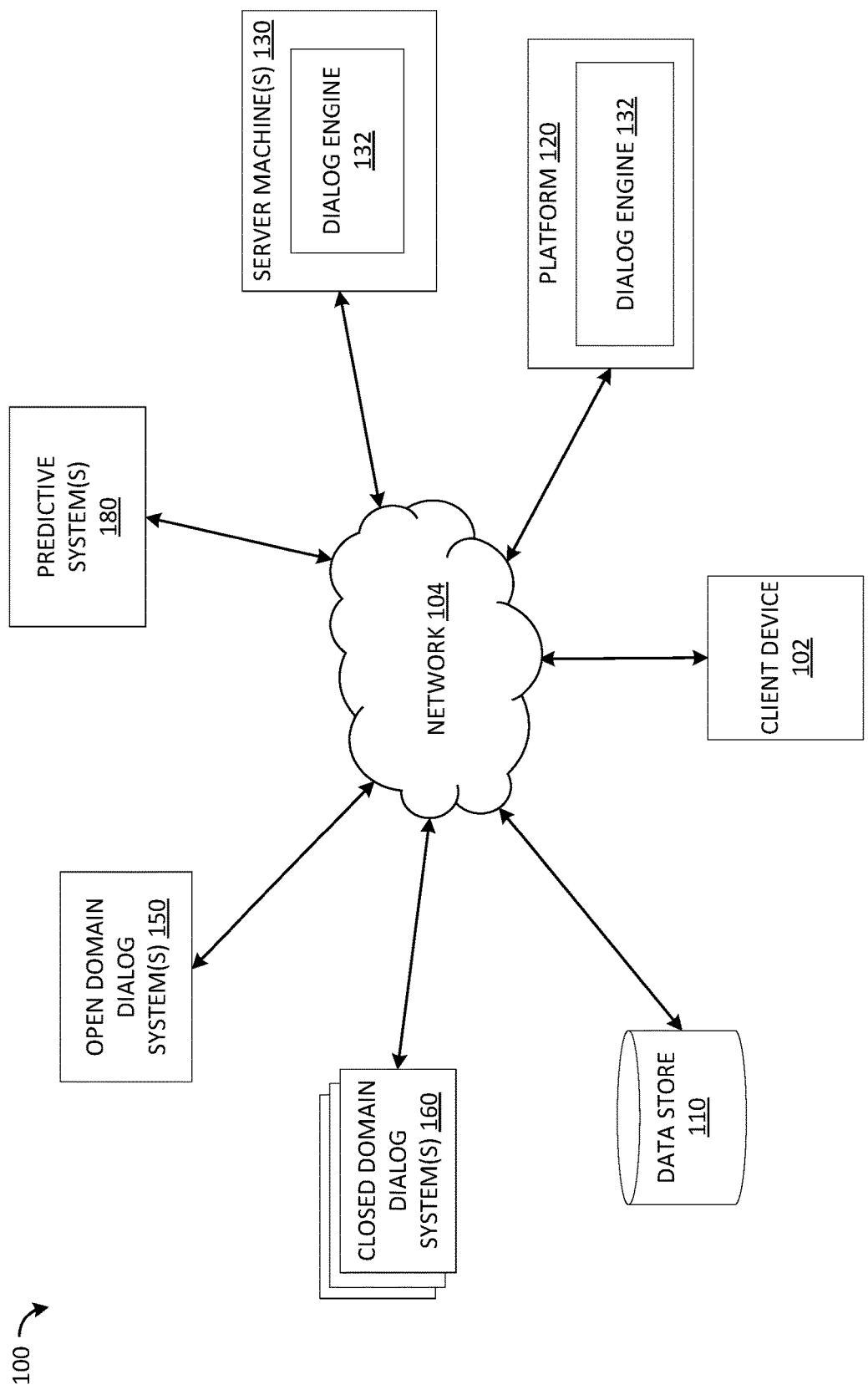
FIG. 1 depicts an illustrative computer system architecture, according to at least one embodiment.

Embodiments of the present disclosure relate to role-based large language models (LLMs) to enable security and accuracy. A LLM refers to a type of artificial intelligence (AI) algorithm that uses deep learning techniques and large data sets to process and/or analyze human language (also referred to as natural language). In some instances, LLMs can understand, summarize, generate, and/or predict new content based on a given input, and are therefore sometimes referred to as "generative AI models," or simply "generative AI." Advancements in deep learning and neural network architectures have expanded the capabilities of language models, specifically LLMs, as tools capable of comprehending and responding according to human language. Recent years have seen a proliferation of applications and other such tools that provide features pertaining to text-based conversations, answering questions, providing information, generating human-like text, and assisting with a wide range of tasks for a user.

An LLM can be trained using large amounts of data, such as books, articles, web pages, and so forth to learn patterns and connections between words, which enables the LLM to generate a response to a user-provided query. In some instances, a LLM is trained, during a training period, using a significantly large training data set (e.g., including millions or billions of data items) relating to a large number of topics. For example, some LLMs are trained using a training data set that includes data items from every (or most) publicly accessible resource (e.g., books, articles, web pages, etc.) of the Internet. After the training period, the LLM can be made available to users (e.g., via an application). For example, an application can enable a user to provide a query pertaining to a task to be performed by the LLM. The application can provide the query (or information from the query) as input to the LLM and can obtain one or more outputs of the LLM.

The one or more outputs can correspond to a response to the query generated by the LLM.

In some instances, the LLM can be retrained based on information of a user-provided query and/or a response to the query that is obtained based on one or more outputs of the LLM. For example, a user-provided query can include or otherwise reference a string of text and a prompt (e.g., an instruction) to the LLM to generate a summary of the string of text. An application can provide the string of text and the prompt as input to the LLM and can obtain one or more outputs, which include a summary of the string of text. A computing system that provides the application and/or supports the LLM can include the string of text of the query and/or the summary of the string of text in a data set that is used to retrain the LLM. Upon retraining of the LLM using the data set, the LLM may generate or otherwise obtain responses to other user-provided queries based on the string of text and/or summary of the string of text that was included in the data set.

In some instances, a user of an application supported by an LLM may be hesitant to provide queries pertaining to certain tasks for analysis or processing by the LLM, as they are concerned that information of the queries may be used to retrain the LLM and may (e.g., inadvertently) be made available to other users of the application. For example, some organizations (e.g., companies, government organizations, religious organizations, trade organizations, etc.) or other such entities may have policies that restrict the use of applications supported by LLMs with respect to particular tasks (e.g., code debugging, etc.), given the concern that information of the queries may be used to retrain the LLM and therefore, may be (e.g., inadvertently) leaked or made public to other users of the application. As users are unable to access applications supported by such LLMs, the user may have to identify other applications or tools (e.g., that do not employ LLMs) to perform the particular tasks, in some instances. It can take a user a significant amount of time to identify another application that is configured or otherwise developed to perform the particular task and, in some instances, applications that perform the task with an accuracy or speed of applications supported by LLMs may not be available. In other or similar instances, the user may have to manually perform the task that would otherwise be queried of the LLM (e.g., manually debug a segment of code, manually generate a summarization of a text string, etc.). In each of the above provided instances, an overall workflow of the user can be disrupted, which can extend the overall amount of time that is spent to perform the task. As the overall amount of time that is spent to perform a task is increased, a number of computing resources (e.g., processing cycles, memory space, etc.) consumed to perform the task increases, and such computing resources are not available for other processes of the computing system. Accordingly, an overall efficiency of the computing system is decreased and an overall latency of the computing system is increased.

Some organizations attempt to address the above described issues by training and/or retraining a LLM using a dataset that includes data of (e.g., collected by, owned, or otherwise associated with) the organization. In one example, during a training period, a LLM can be trained using an initial data set that includes data of the organization (e.g., and does not include data that is not outside of the organization). The LLM is then made available to users (e.g., via an application of the organization) and the LLM can be retrained using information of queries provided by users and/or responses to the queries obtained based on outputs of the LLM. In another example, during a training period, a LLM can be trained using an initial data set that includes data of the organization and/or data that is outside of the organization (e.g., data that is obtained from publicly accessible resources of the Internet, etc.). After the LLM is made available to users (e.g., via the application of the organization), the LLM can be retrained using information of queries provided by users and/or responses to the queries obtained based on outputs of the LLM. In the above described examples, the LLM may only be made available to users associated with the organization and may not be available to users outside of the organization.

As indicated above, LLMs that are trained using only (or primarily) data of an organization may be specifically trained to perform tasks pertaining to the organization and may not be trained (e.g., to a threshold level of accuracy) to perform other types of tasks. User-provided queries may involve performing multiple different tasks, some of which may not be performed (e.g., to the threshold level of accuracy) by such LLMs. Accordingly, such LLMs may not be capable of providing users with accurate and/or complete responses to some queries and users may have to identify other applications or tools to perform tasks of their queries and/or may have to manually perform the task. This can cause an overall efficiency of the computing system to be decreased and an overall latency of the computing system to be increased, as described above.

Embodiments of the present disclosure address the above and other deficiencies by providing techniques for role-based large language models (LLMs) to enable security and accuracy. In some embodiments, a platform can provide users with access to one or more open domain dialog systems and/or one or more closed domain dialog systems. An open domain dialog system refers to a system that employs one or more LLMs that have been trained to provide responses (e.g., human-like responses) to queries that are more general or colloquial, rather than detailed or specific about a particular topic. LLMs of an open domain dialog system may be trained using a training data set that includes data items obtained from a large number of resources and relate to a large number of topics. For example, LLMs of an open domain dialog system can be trained using a training data set that includes data items from every (or most) publicly accessible resource (e.g., books, articles, web pages, etc.) of the Internet. A closed domain dialog system refers to a system that employs one or more LLMs that have been trained to provide specific, informed responses relating to a specific set of topics and/or domains. LLMs of a closed domain dialog system may be trained using a training data set that includes data items relating to the specific set of topics and/or domains. In an illustrative example, LLMs of a closed domain dialog system may be trained using a training data set that includes data items of a particular organization or other such entity. Such LLMs may be trained to provide responses relating to a specific set of topics pertaining to the organization.

The platform may receive a query of a user for performance of a task using one or more LLMs, in some embodiments. Example tasks that can be performed using an LLM can include, but are not limited to, content creation, data analysis (e.g., summarization, translation, code generation, etc.), process automation (e.g., email drafting, report generation, etc.), and so forth. In some embodiments, the query can be associated with a privacy status. In some embodiments, the privacy status can indicate whether information of the query is private, confidential, or sensitive to the user (or an organization or entity associated with the user) that provided the query. In additional or alternative embodiments, the privacy status can indicate a level of privacy, confidentiality, or sensitivity of the information of the user-provided query. In some embodiments, an indication of the privacy status can be provided with the query (e.g., from a client device associated with the user). In some embodiments and examples of the present disclosure, queries may be described as having a high-level privacy status (e.g., indicating that the queries include information that is private, confidential, or sensitive to the user or entity that provided the query) to a low-level privacy status (e.g., indicating that the queries do not include information that is private, confidential, or sensitive to the user or entity that provided the query). Examples of queries that have a high-level privacy status can include information that is confidential or otherwise sensitive to an organization or entity (e.g., proprietary information pertaining to the organization's function, etc.), information that is confidential or otherwise sensitive to a user (e.g., medical information of a user, etc.), and so forth. In other or similar embodiments, the platform can determine the privacy status of the information of the query (e.g., based on the type of data included in the query, based on an organization associated with the client device that provided the query to the platform, etc.). Further details regarding the privacy status for a user-provided query are provided herein.

Upon receiving a user query (e.g., from a client device associated with a user), the platform can determine the privacy status associated with the user query, as described herein. In response to determining that the query has a first privacy status (e.g., has a low-level privacy status), the platform can provide the user query to the open domain dialog system. The open domain dialog system can obtain a response to the user query based on an output of one or more machine learning models (e.g., large language models (LLMs)) that are trained to predict responses to user queries having the first privacy status. The open domain dialog system can provide the response (or at least a portion of the response) to the platform, and the platform can provide the response to the query to the client device of the user, in accordance with the user query. In some embodiments, the platform can include the user query and/or the response to the user query in a training data set that is used to retrain the one or more machine learning models. The platform can include the user query and/or the response to the user query in the training data set based on the determination that the user query is associated with the first privacy status.

In other or similar embodiments, the platform can determine that the user-provided query has a second privacy status (e.g., a high-level privacy status). In such embodiments, the platform can identify a closed domain dialog system that is associated with a context of the query and can forward the query to the identified closed domain dialog system. For example, the user query can include information that is associated with a particular organization. The platform can identify a closed domain dialog system that is owned by or otherwise associated with the particular organization and forward the query to the identified closed domain dialog system. In another example, the user query can include information pertaining to medial information of a user. The platform can identify a closed domain dialog system that employs LLMs that are trained to perform tasks pertaining to the medical context and can forward the query to the identified closed domain dialog system.

In some embodiments, the closed domain dialog system can provide the query (or information of the query) as input to one or more machine learning models (e.g., LLMs) that are trained to perform tasks corresponding to the context of the query. The closed domain dialog system can obtain one or more outputs of the machine learning models and, in some embodiments, can provide the response to the query based on the one or more outputs directly to the client device that provided the query. In other or similar embodiments, the closed domain dialog system can provide the response to the query to the platform and the platform can provide the response to the client device.

In view of the determination that the user query is associated with the second privacy status (e.g., the high-level privacy status), the platform may not include the query and/or the response to the query in a training data set to retrain the machine learning model(s) associated with the open domain dialog system. Accordingly, information of queries having a high-level privacy status and/or their responses may not be used to train (or retrain) machine learning models of an open domain dialog system, and therefore may not be used by the machine learning models of the open domain dialog system to provide responses to other queries from other users.

Aspects and embodiments of the present disclosure provide techniques to enable accurate and secure engagement with dialog systems that employ LLMs. As indicated above, upon receiving a query, a platform can determine a privacy status for the query and, in some instances, a context for the query. Based on the determined query privacy status and context, the platform can forward the query to the appropriate dialog system for obtaining the response to the query. If the query has a low-level privacy status, the platform can include the query and/or an obtained response in a training data set that is used to retrain one or more machine learning models to provide more accurate predictions and/or recommendations in response to incoming queries. If the query has a high-level privacy status, the platform does not include the query and/or the obtained response in the training data set used to retrain the one or more machine learning models, and therefore information that is private, confidential and/or sensitive to a user (or an organization or entity associated with the user) is not used to provide recommendations to incoming queries. Therefore, a user can obtain a response to a query by providing the query to the platform, and the user does not have to identify specialized application or tools that can accurately and securely provide a response to the query. Similarly, the user does not have to manually perform the task relating to the query. Accordingly, a workflow of the user is not interrupted and the overall amount of time spent to perform a task of the query is minimized. As the amount of time to perform the task of the query is minimized, fewer computing resources (e.g., processing cycles, memory space, etc.) of the overall computing system are consumed, making such computing resources available to other processes. This can increase an overall efficiency and decrease an overall latency of the computing system.

The systems and methods described herein may be used for a variety of purposes, by way of example and without limitation, these purposes may include systems or applications for online multiplayer gaming, machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Disclosed embodiments may be comprised in a variety of different systems such as systems for participating on online gaming, automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 depicts an illustrative computer system architecture, according to aspects of the present disclosure. The system architecture 100 (also referred to as "system" herein) includes one or more client devices 102, a data store 110, a platform 120, one or more server machines 130, and/or a predictive system 180, each connected to a network 104. In some embodiments, system 100 may additional or alternatively include one or more open domain dialog systems 150 and/or one or more closed domain dialog system(s) 160. In other or similar embodiments, client device 102, platform 120, server machine(s) 130, predictive system(s) 180, and/or data store 110 may be connected to open domain dialog system(s) 150 and/or closed domain dialog system(s) 160 via network 104. In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104.

Client device(s) 102 (collectively and individually referred to herein as client device 102) refers to any device (or software that executes using a device) that requests access to data and/or a service provided by a computing service (e.g., platform 120). In some embodiments, client device 102 may include computing devices such as personal computers (PCs), laptops, mobile phones, smart phones, tablet computers, netbook computers, network-connected televisions, etc. In other or similar embodiments, client devices 102 can include or be connected to a virtual reality (VR) device (e.g., a VR headset) that is configured to provide a VR experience to a user of platform 120 and/or platform 140. The VR device can be a monolithic VR device (e.g., a VR headset that includes a dedicated processor and/or power source) or another type of VR device, in some embodiments. In some implementations, client devices 102A-N may also be referred to as "user devices." Client device 102 may include a content viewer. In some implementations, a content viewer may be an application that provides a user interface (UI) for users to view or upload content, such as images, video items, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In another example, the content viewer may be a standalone application (e.g., a mobile application or app) that allows users to view digital media items (e.g., digital video items, digital images, electronic books, etc.).

Platform 120 can provide users (e.g., of client devices 102) with access to one or more applications, in some embodiments. In some embodiments, platform 120 can provide users with access to applications that employ one or more machine learning models, such as a large language model (LLM). A LLM refers to a type of artificial intelligence (AI) algorithm that uses or otherwise accesses deep learning techniques and large data sets to process and/or analyze human language (also referred to as natural language). In some embodiments, the applications can employ one or more machine learning models of open domain dialog system(s) 150 (hereinafter referred to collectively and individually as open domain dialog system 150) and/or closed domain dialog system(s) 160 (hereinafter referred to collectively and individually as closed domain dialog system 160).

As indicated above, open domain dialog system 150 can employes one or more LLMs that have been trained to provide responses (e.g., human-like responses) to queries that are more general or colloquial, rather than detailed or specific about a particular topic. LLMs of an open domain dialog system may be trained (e.g., by predictive system 180) using a training data set that includes data items obtained from a large number of resources and relate to a large number of topics. For example, LLMs of open domain dialog system 150 can be trained using a training data set that includes data items from every (or most) publicly accessible resource (e.g., books, articles, web pages, etc.) of the Internet. As also indicated above, closed domain dialog system 160 refers to a system that employs one or more LLMs that have been trained to provide specific, informed responses relating to a specific set of topics and/or domains. LLMs of closed domain dialog system 160 may be trained using a training data set that includes data items relating to the specific set of topics and/or domains. In an illustrative example, LLMs of closed domain dialog system 150 may be trained using a training data set that includes data items of a particular organization or other such entity. Such LLMs may be trained to provide responses relating to a specific set of topics pertaining to the organization.

It should be noted that some embodiments and examples of the present disclosure refer to open domain dialog system 150 and/or closed domain dialog system 160 employing or accessing LLMs to perform tasks of user-provided queries. However, open domain dialog system 150 and/or closed domain dialog system 160 can employ or access any type of AI techniques and/or machine learning techniques to perform tasks of user-provided queries. Such techniques can include, but are not limited to, neural network techniques (e.g., artificial neural network, convolutional neural network, etc.), support vector machine (SVM) techniques, decision-making techniques, logistic regression techniques, linear regression techniques, random forest techniques, Naïve Bayes classifier techniques, K-nearest neighbors techniques, K-means clustering, regression analysis techniques, vector-based techniques, principal component analysis techniques, hierarchical clustering techniques, logistics-based techniques, normal distribution techniques, XGBoost techniques, gradient boosting techniques, decision tree learning techniques, AdaBoost techniques, boosting techniques, Bayesian inference techniques, ridge regression techniques, stochastic gradient descent techniques, and so forth.

In some embodiments, platform 120 can include a dialog engine 132 that is configured to facilitate a dialog between a user of client device 102 and open domain dialog system 150 and/or closed domain dialog system 160. A dialog refers to an interaction between a user and a computing system. In some embodiments, a dialog can include a query provided by a user for performance of a particular task. The dialog can additionally or alternatively include a response to the query (e.g., obtained based on one or more outputs of machine learning models of open domain dialog system 150 and/or closed domain dialog system 160.

Platform 120 can obtain a user query (e.g., provided using client device 102) and can forward the user query to open domain dialog system 150 and/or closed domain dialog system 160, as described herein. In some embodiments, platform 120 can provide a user interface (UI) associated with the application to client device 102. The UI can support any suitable types of user inputs, e.g., speech inputs (captured by a microphone), text inputs (entered using a keyboard, touchscreen, or any pointing device), camera (e.g., for recognition of sign language), and/or the like, or any combination thereof. The UI may further support any suitable types of outputs, e.g., speech outputs (using one or more speaker), text, graphics, and/or sign language outputs (e.g., displayed using any suitable screen), file for a word editing application, and/or the like, or any combination thereof. In some embodiments, the UI can be a web-based UI (e.g., a web browser-supported interface), a mobile application-supported UI, or any combination thereof. UI 642 may include selectable items. In some embodiments, the UI may allow a user to select from multiple (e.g., specialized in particular knowledge areas) machine learning models (e.g., of open domain dialog system 150 and/or closed domain dialog system 160). The UI may allow the user to provide consent for dialog engine 132, dialog system 150 and/or dialog system 160 to access user data (e.g., previously stored in data store 110 and/or any other memory device), process and/or store new data received from the user, and the like. The UI may allow the user to withhold consent to provide access to user data for dialog engine 132, dialog system 150 and/or dialog system 160. In some embodiments, user inputs entered using the UI may be communicated to dialog engine 132 using a user application programming interface (API). In some embodiments, the UI and the user API may be located on client device 102. For example, an API package associated with the user API and/or the user interface may be downloaded to client device 102. The downloaded API package may be used to install the user API and/or the user interface to enable the user to have two-way communication with dialog engine 132.

In accordance with above described embodiments, a user of client device 102 can provide a query via the user interface of client device 102. In some embodiments, a query can include or otherwise correspond to a request to perform a task. The query can additionally or alternatively include information pertaining to the task. In an illustrative example, the query can include a request to summarize a text string. The query can additionally or alternatively include the text string to be summarized. In another illustrative example, the query can include a request to debug (e.g., identify errors in and correct) a segment of code. The query can additionally or alternatively include the segment of code to debug and/or a pointer to a section of a file (e.g., a source code file) that includes the segment of code to debug. Upon detecting that the user has provided the query via the user interface, the client device 102 can transmit the query to platform 120 (e.g., via network 104). Dialog engine 132 can determine a privacy status and/or a context associated with the query and can forward the query to open domain dialog system 150 and/or closed domain dialog system 160 based on the determination. In some embodiments, dialog engine 132 can receive a response to the query from open domain dialog system 150 and/or closed domain dialog system 160. Platform 120 can forward the obtained response to client device 102, which can provide the response (or at least a portion of the response) to the user via the user interface. In additional or alternative embodiments, open domain dialog system 150 and/or closed domain dialog system 160 may provide the response to the query directly to client device 102 (e.g., via network 104) for presentation to the user via the user interface, as described above.

In some embodiments, a user-provided query and/or a response to a user-provided query can be included in a data set that is used to train (or retrain) machine learning models of open domain dialog system 150 and/or closed domain dialog system 160. In some embodiments, dialog engine 132 can include the query and/or the response in the training data set and can provide the training data set to one or more predictive systems 180. Predictive system(s) 180 can use the training data set to retrain the machine learning models, in accordance with embodiments described herein. Further details regarding including a user-provided query and/or a response in a training data set to train/retrain machine learning models of open domain dialog system 150 and/or closed domain dialog system 160 are described herein.

It should be noted that although FIG. 1 illustrates dialog engine 132 as part of platform 120, in additional or alternative embodiments dialog engine 132 can reside on one or more server machines that are remote from platform 120. For example, dialog engine 132 can reside at server machine 130. It should be noted that in some other implementations, the functions of platform 120, server machine 130, open domain dialog system 150, closed domain dialog system 160 and/or predictive system(s) 180 can be provided by more or a fewer number of machines. For example, in some implementations, components and/or modules of platform 120, server machine 130, open domain dialog system 150, closed domain dialog system 160 and/or predictive system(s) 180 may be integrated into a single machine, while in other implementations components and/or modules of any of platform 120, server machine 130, open domain dialog system 150, closed domain dialog system 160 and/or predictive system(s) 180 may be integrated into multiple machines. In addition, in some implementations, components and/or modules of server machine 130, open domain dialog system 150, closed domain dialog system 160 and/or predictive system(s) 180 into platform 120.

In general, functions described in implementations as being performed platform 120. server machine 130, open domain dialog system 150, closed domain dialog system 160 and/or predictive system(s) 180 can also be performed on the client device 102 in other implementations. In addition, the functionality attributed to a particular component can be performed by different or multiple components operating together. Platform 120 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
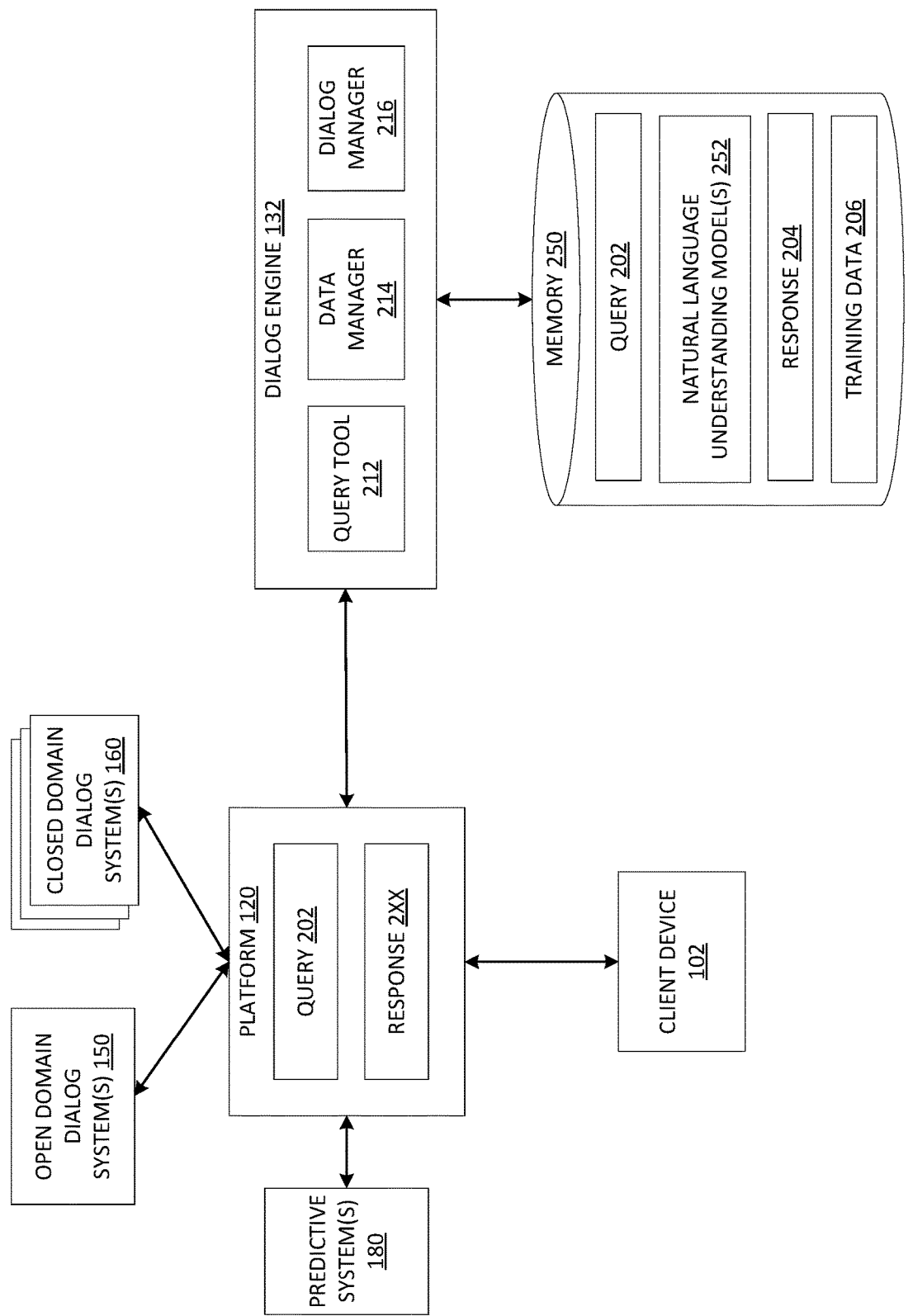
FIG. 2 is a block diagram that includes an example platform and an example dialog engine, according to at least one embodiment.

FIG. 2 is a block diagram that includes an example platform 120 and an example dialog engine 132, according to aspects of the present disclosure. As described above, dialog engine 132 can reside at or can otherwise be connected to platform 120 (e.g., using network 104). In some embodiments, platform 120 and/or dialog engine 132 can be connected to memory 250. Memory 250 can correspond to one or more portions of data store 110, in some embodiments. In additional or alternative embodiments, memory 250 can correspond to any memory of, connected to, or accessible by a component of system 100.

As described above, dialog engine 132 can facilitate a dialog between a user of client device 102 and open domain dialog system 150 and/or closed domain dialog system 160. The dialog can include queries provided by a user of a client device 102 to platform 120 and/or responses to the queries obtained based on outputs of one or more machine learning models (e.g., LLMs) of open domain dialog system 150 and closed domain dialog system 160. As illustrated in FIG. 2, dialog engine 132 can include a query tool 212, a data manager 214, and/or a dialog manager 216. In additional or alternative embodiments, dialog engine 132 can include additional or alternative components (e.g., automatic speech recognizer 410, text to speech converter 470, etc.), as described with respect to FIG. 4. Embodiments and examples pertaining to the facilitation of the dialog by dialog engine 132 are described, at least, with respect to FIGS. 2-4 herein.

Figure 3:
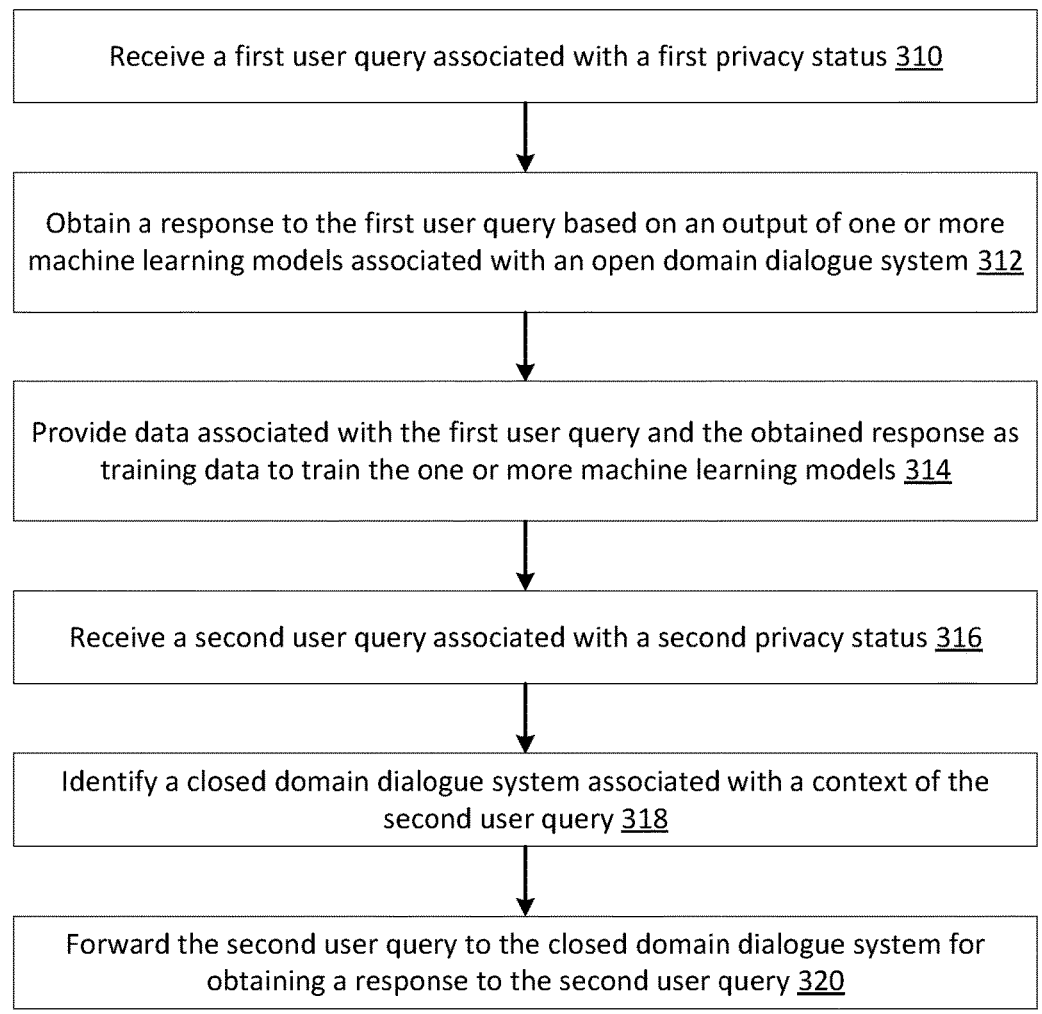
FIG. 3 is a flow diagram depicting an example method, according to at least one embodiment.

FIG. 3 is a flow diagram depicting an example method 300, according to aspects of the present disclosure. In some embodiments, method 300 can be performed by platform 120 and/or one or more components of or connected to platform 120. For example, one or more operations of method 300 can be performed by dialog engine 132, in some embodiments. Method 300 may be performed by one or more processing units (e.g., CPUs and/or GPUs), which may include (or communicate with) one or more memory devices. In at least one embodiment, method 300 may be performed by multiple processing threads (e.g., CPU threads and/or GPU threads), each thread executing one or more individual functions, routines, subroutines, or operations of the method. In at least one embodiment, processing threads implementing method 300 may be synchronized (e.g., using semaphores, critical sections, and/or other thread synchronization mechanisms). Alternatively, processing threads implementing method 300 may be executed asynchronously with respect to each other. Various operations of method 300 may be performed in a different order compared with the order shown in FIG. 3. Some operations of the methods may be performed concurrently with other operations. In at least one embodiment, one or more operations shown in FIG. 3 may not always be performed.

At block 310, processing logic receives a user query associated with a first privacy status. In some embodiments, processing logic can run on or otherwise be associated with a processing device associated with an open domain dialog system. The query can include textual data, audio data, and/or video data, in some embodiments. The first privacy status can be associated with one or more organizations associated with client devices that transmitted the user query, one or more geographic locations associated with the client devices that transmitted the user query, a task type associated with one or more tasks pertaining to the user query, or a data type associated with one or more data items accessed to perform the one or more tasks pertaining to the user query.

Figure 4:
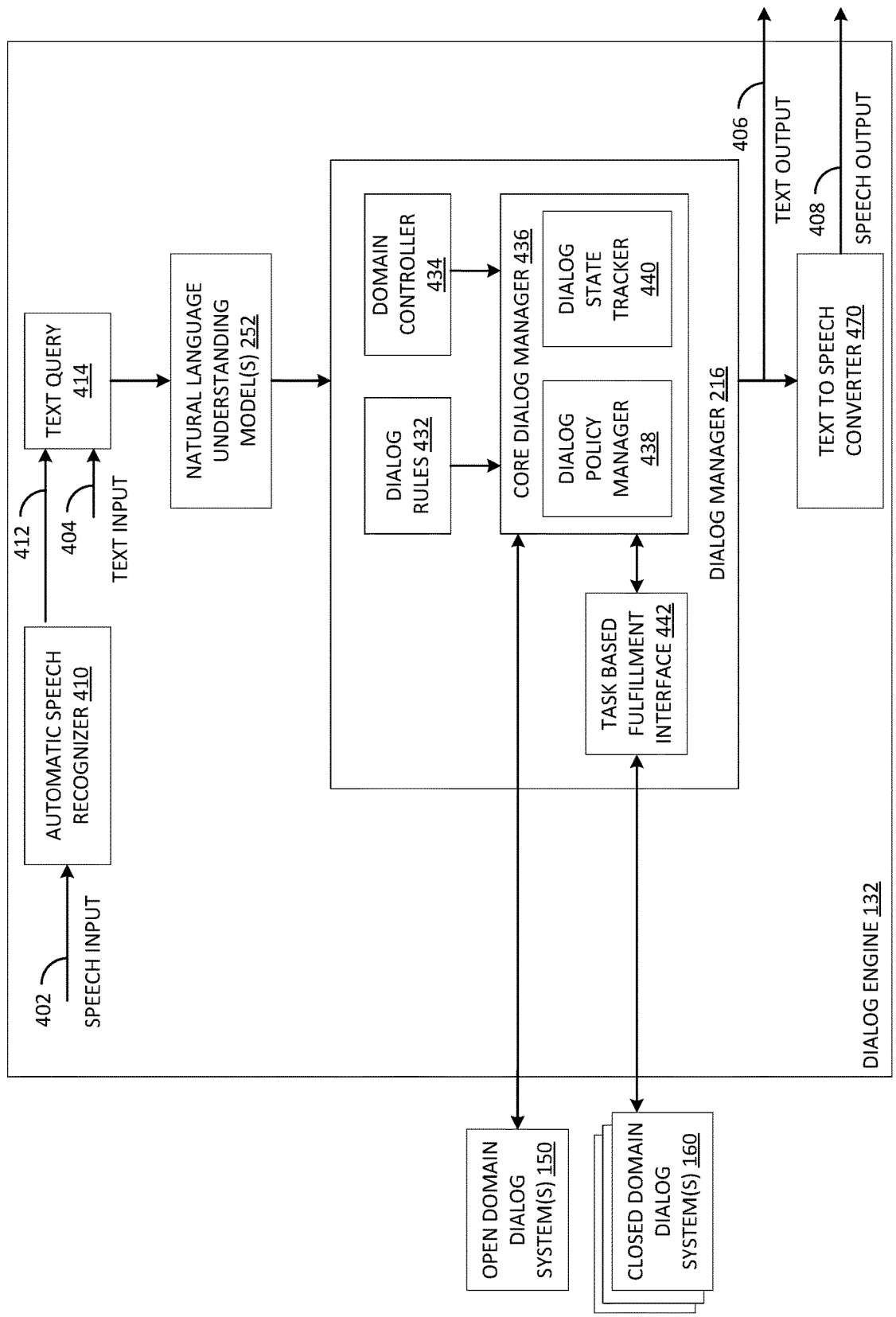
FIG. 4 is a block diagram that includes an example dialog manager, according to at least one embodiment.

As described above, a user can provide a query 202 and/or information associated with a query 202 via a user interface of client device 102. Upon detecting that the user provided the query 202, client device 102 can transmit the query 202 to platform 120, and platform 120 can provide the query 202 to dialog engine 132. As described above, dialog engine 132 can include a query tool 601 that is configured to facilitate the identification and retrieval of relevant and timely contextual information for quick and accurate processing of user queries by open domain dialog system 150 and/or closed domain dialog system 160. In some embodiments, the query 202 can be provided by the user in a human language or natural language format. Query tool 212 can convert the query 202 to a format that is understandable by machine learning models of system 150 and/or system 160. As illustrated by FIG. 4, a user can provide a query 202 via a speech input 402 and/or via a text input 404. If the user provides the query 202 as a speech input 402, query tool 212 can provide the speech input 402 as input to an automatic speech recognizer 410 that is configured to generate textual data based on given input audio data. Query tool 212 can obtain one or more outputs of automatic speech recognizer 410, the one or more outputs including a textual representation 412 (e.g., a transcript) of the speech input 402.

Query tool 212 can generate a text query 414 based on the textual representation 412 and/or the text input 404. In some embodiments, query tool 212 can analyze the text query 414 to identify a portion of the query 202 that corresponds to a request (e.g., to generate a summarization, to debug code) and another portion of the query 202 that corresponds to information pertaining to the request (e.g., a text string to be summarized, a segment of code to be debugged, etc.). In some embodiments, query tool 212 can generate metadata (e.g., a flag) that indicates the portion of the query 202 that corresponds of the request and the portion of the query 202 that corresponds to information pertaining to the request.

Query tool 212 and/or data manager 214 can store the metadata at memory 250, in some embodiments.

In some embodiments, query tool 212 can determine and/or identify additional data or information that will be provided with the query to obtain the response. In some embodiments, query tool 212 can determine whether additional data or information will be provided with the query 202 to obtain the response based on a type of the request and/or the type of information provided with the request. For example, a query can include a request to generate a summarization of a text string and can include a pointer (e.g., a memory address) of a region of memory 250 (or another memory) that stores the text string. In some embodiments 212, query tool 212 can provide an indication of the pointer to data manager 214 and data manager 214 can retrieve the text string from the region of memory that stores the text string. In other or similar embodiments, query tool 212 can determine whether additional data or information will be provided with the query 202 to obtain the response by generating an intermediate query based on the user-provided query 202 and providing the intermediate query to a machine learning model (e.g., of dialog system 150 and/or dialog system 160). The intermediate query can include the request of query 202, the information of query 202 that pertains to the request, and/or information obtained by data manager 214. Query tool 212 can feed the intermediate query to one or more machine learning models of dialog system 150 and/or dialog system 160 and can obtain one or more outputs of the model(s). In some embodiments, the one or more outputs can indicate additional information that is needed to perform the task of the request. Data manager 214 can retrieve the additional information from memory 250 and/or from another resource of or connected to system 100, in some embodiments.

Dialog manager 216 can be configured to identify an appropriate dialog system that includes machine learning models to be used to obtain a response to query 202, in accordance with embodiments described herein. As indicated above, each query 202 received by platform 120 can be associated with a privacy status. A privacy status can indicate whether the query 202 includes information that is private, confidential, or otherwise sensitive to a user (or an organization or entity associated with the user) that provided the query 202. In additional or alternative embodiments, the privacy status can indicate a level of privacy, confidentiality, or sensitivity of the information of the query 202. Dialog manager 216 can determine the privacy status associated with query 202, as described below.

It should be noted that some embodiments and examples of the present disclosure describe queries 202 having a privacy status of a high-level of privacy or a low-level of privacy. However, a query 202 can have any type of privacy status, according to embodiments of the present disclosure. For example, a query 202 can have a privacy status of "including private information," or "not including private information." In another example, a query 202 can have a privacy status of "including private information with a privacy level of 1," "including private information with a privacy level of 2," "including private information with a privacy level of 3," and so forth (e.g., where a privacy level 1 corresponds to a higher level of privacy or confidentiality than a privacy level of 3). Embodiments and examples of the present disclosure that describe queries 202 of having a privacy status of a high-level of privacy or a low-level of privacy are provided for the purpose of example and explanation only and are not intended to be limiting.

In some embodiments, client device 102 can provide platform 120 with an indication of the privacy status associated with query 202. For example, the user of client device 102 can be associated with a particular organization or entity and client device 102 can be owned or managed by the organization or entity (e.g., for use by the user). Settings or protocols of such client device 102 can provide that each query 202 submitted by a user to platform 120 is to have a particular privacy status (e.g., a high-level of privacy). Accordingly, each query 202 transmitted to platform 120 by client device 102 (or other client devices associated with the organization) can include an indication of the particular privacy status defined by the settings or protocols. Dialog manager 216 can determine the privacy status for the query 202 based on the indication received from client device 102, in such embodiments.

In other or similar embodiments, dialog manager 216 can determine the privacy status for query 202 based on one or more outputs of a natural language understanding model 252. Natural language understanding model 252 can be an AI model that is trained to understand a semantic context associated with a given text query (e.g., text query 414) and associate the text query with a domain tag and/or an intent classification. As illustrated by FIG. 4, the text query 414 associated with query 202 can be provided as input to one or more natural language understanding models 252.

In some embodiments, the domain tag may be a tag for a specific closed domain dialog system of the one or more closed domain dialog system(s) 160. The closed domain dialog systems 160—and corresponding tags—may include, but are not limited to, navigation systems, weather systems, restaurant systems, sports systems, music systems, movie theater systems, and/or the like. Tags corresponding to the one or more closed domain dialog system(s) 160 may be associated with the text query 414 by the natural language understanding model 252. In some embodiments, a domain tag can correspond to or otherwise indicate a privacy status associated with the closed domain dialog system 160 (e.g., a high level of privacy). In such embodiments, dialog manager 216 can determine the privacy status of query 202 based on the domain tag obtained based on outputs of natural language understanding model 252.

The natural language understanding model 252 may determine an intent for the text query 414 (also referred to as a query context herein) by predicting why the user is submitting the text query 414 and what the user is wanting to achieve via the text query 414. Accordingly, the natural language understanding model 252 may associate one or more determined intent classifications with the text query 414. For example, the natural language understanding model 252 may associate a navigation intent and a restaurant intent to the text query 414 when textual data for the text query 414 states, "What is the best barbeque in Seattle." The natural language understanding model 252 may associate these intents with the text query 414 because the natural language understanding model 252 may predict that the user wants the dialog management system 100 to provide the user with information about a barbeque restaurant in Seattle with the best reviews.

In some embodiments, dialog manager 216 may determine which dialog system to forward the query 202 based on the determined domain tag and query context for query 202. The dialog manager 216 may include or access dialog rules 423, a domain controller 434, a core dialog manager 436—that may include a dialog policy manager 438 and a dialog state tracker 440—and a task fulfillment interface 442. The dialog rules 432 may include routing rules for routing the text query 414 to a specific domain based on a domain tag. In some embodiments, dialog rules 432 can be provided by an engineer or developer of platform 120 and/or can be determined based on historical activity of system 100. In operation, when the text query 414 and the corresponding domain tag(s) and/or intent classification(s) are obtained by the dialog manager 216, the dialog manager 216 may access the domain tag and intent classification for the text query. The domain tag and intent classification may be used to determine whether the dialog rules 423 includes rules to route the text query 414 to a domain dialog system that corresponds to the domain tag and intent classification. For example, if the text query 414 is associated with a specific domain tag that is associated with rules in the dialog rules 432, then the text query 414 may be transmitted to a corresponding specific domain based on the rules—such as one of the closed domain dialog system(s) 160. If the text query 414 is not associated with a specific domain tag or the domain tag is not associated with any rules in the dialog rules 432, then the text query may be routed to a default domain—such as one of the open domain dialog system(s) 150.

In some embodiments, policies corresponding to each of the one or more open domain dialog system(s) 150 and/or the one or more closed domain dialog system(s) 160 may be stored in the dialog policy manager 438. When a domain tag for the text query 414 corresponds to a determined domain dialog system, the dialog manager 216 may access the dialog policy manager 438 to identify a corresponding policy. The one or more open domain dialog system(s) 150 and/or the one or more closed domain dialog system(s) 160 may require the dialog manager 216 to execute a policy for a determined domain dialog system. Based on one or more policies corresponding to the specific domain, the dialog manager 216 may generate a request for the determined domain dialog system. For example, a request for the determined domain dialog system may require that input slot information from the text query 414 be filled in (e.g., find weather (location="seattle", day="monday", time-"evening")) to allow the task based fulfillment interface 442 to communicate with the determined domain dialog system.

When the text query 414 is communicated to the one or more open domain dialog system(s) 150 and/or the one or more closed domain dialog system(s) 160, the text query 414 may be processed by the one or more open domain dialog system(s) 150 and/or the one or more closed domain dialog system(s) 160 to return one or more response(s) (e.g., a textual response) to the text query 414. For example, open domain dialog system 150 and/or closed domain dialog system 160 can provide the text query 414 as input to a LLM associated with the respective dialog system and can obtain one or more outputs of the LLM. The one or more outputs can correspond to a response returned by the LLM to the query, in accordance with previously described embodiments. At least one of the returned responses (e.g., from open domain dialog system 150 and/or closed domain dialog system 160) may be provided to the user via text output 406 and presented to the user via the user interface of client device 102, as described below. Additionally or alternatively, the response (e.g., text output 406) may be passed to the text to speech converter 470. The text to speech converter 470 may process the response to generate audio data corresponding to the response to generate speech output 408. The speech output 408 may be provided to the user via an audiovisual component (e.g., a speaker, etc.) of client device 102.

In some embodiments, the dialog state tracker 440 may track interactions with the one or more open domain dialog system(s) 150 and/or the one or more closed domain dialog system(s) 160 to maintain a dialog state for a user. The dialog state may refer to a history, an estimate of a user's intent, and/or status of a user's conversation with a digital assistant application. The dialog state tracker 440 may maintain a dialog state based on one or more received text queries 414 and/or one or more responses received from the one or more open domain dialog system(s) 150 and/or the one or more closed domain dialog system(s) 160.

Referring back to FIG. 3, at block 312, processing logic obtains a response to a first user query based on an output of one or more machine learning models associated with an open domain dialog system. Each of the machine learning models may be trained to predict responses to user queries associated with a first privacy status. Dialog manager 216 can determine that query 202 is to be forwarded to open domain dialog system 150, as described above, and can forward query 202 to system 150 in accordance with the determination. In some embodiments, dialog manager 216 can receive a response 204 to the query 202 from open domain dialog system 150. For example, open domain dialog system 150 can provide the query 202 and/or additional information associated with the query 202 as input to a LLM associated with open domain dialog system 150 and can obtain one or more outputs that correspond to a response 204 to the query 202. In some embodiments, open domain dialog system 150 can provide the response 204 to platform 120 (e.g., via network 104) and platform 120 can provide the response 204 to the user of client device 102 via the user interface. The response 204 can be included in the dialog between the user and open domain dialog system 150, as described above. In other or similar embodiments, open domain dialog system 150 can provide the response 204 directly to client device 102 and client device 102 can provide the response 204 to the user via the user interface, as described above.

At block 314, processing logic provides data associated with the first user query and the obtained response as training data to train the one or more machine learning models. Processing logic can provide the data in view of the first privacy status. In some embodiments, dialog manager 216 can update a training data set (e.g., depicted as training data 206) to include the query 202 and the response 204. Dialog manager 216 can provide the training data set 206 to predictive system(s) 180 to be used for training or retraining of open domain dialog system 150, as described below with respect to FIG. 5. In some embodiments, training data 206 can include other queries provided by other users of platform 120 and/or responses to the other queries, as described above. Dialog manager 216 may provide training data 206 responsive to determining that a number of queries 202 and/or responses 204 added to training data 206 exceeds a threshold number, in some embodiments. In other or similar embodiments, dialog manager 216 can provide training data 206 upon updating training data 206 to include query 202 and/or response 204.

At block 316, processing logic receives a second user query associated with a second privacy status. Platform 120 can receive the second user query from client device 102 or from another client device of system 100, in accordance with previously described embodiments. Query tool 212 can generate a text query 414 based on the second user query, as described above. Dialog manager 216 can determine the privacy status and/or the context of the query in accordance with embodiments described above (e.g., with respect to FIG. 4).

At block 318, processing logic identifies a closed domain dialog system associated with a context of the second user query. The closed domain dialog system may have a third privacy status corresponding to the second privacy status of the second user query. As described above, dialog rules 432 can include routing rules for routing queries to specific domains based on a domain tag obtained based on one or more outputs of natural language understanding model(s) 252. Dialog manager 216 can obtain a domain tag and/or the query context for the second user query, as described above. Upon obtaining the domain tag and/or the query context, dialog manager 216 can determine a closed domain dialog system 160 that corresponds to the domain tag and/or context query for the second user query (e.g., in view of dialog rules 432). In an illustrative example, the domain tag can indicate that the second user query includes a task pertaining to the medical field. Dialog manager 216 can identify a closed domain dialog system 160 that performs tasks pertaining to the medical field based on the dialog rules 432. In another illustrative example, the domain tag can indicate that the second user query includes a task pertaining to a particular organization or entity. Dialog manager 216 can identify a closed domain dialog system 160 that performs tasks pertaining to the organization or entity based on the dialog rules 432.

The third privacy status can correspond to the second privacy status of the second user query, in some embodiments. For example, the second privacy status indicate that the second user query has a high privacy level. The third privacy status of the closed domain dialog system 160 can correspond to the high privacy level (e.g., as defined by dialog rules 432). Accordingly, the second privacy status of the second user query can correspond to the third privacy status of the identified closed domain dialog system 160.

At block 320, processing logic forwards the second user query to the closed domain dialog system for obtaining a response to the second user query. In some embodiments, the closed domain dialog system 160 can obtain the response by providing the second user query as input to one or more LLMs associated with the closed domain dialog system, as described above. The closed domain dialog system 160 can provide the obtained response to platform 120 and/or to client device 102 for presentation to the user, as described above. In some embodiments, the closed domain dialog system 160 can encrypt the response using an encryption key and/or an encryption secret that is unknown to the open domain dialog system 160 but is known to the client device 102 (e.g., the encryption key and/or encryption secret was previously transmitted to client device 102, etc.). In such embodiments, the closed domain dialog system 160 can provide the response to the platform 120 and platform 120 can forward the response to client device 102. Client device 102 can decrypt the response using the known encryption key and/or encryption secret prior to providing the response to the user via the user interface. The response to the second user query can be included in the dialog between the user and the closed domain dialog system 160, in some embodiments.

Data associated with the second user query is not provided as training data to train the one or more machine learning models associated with the open domain dialog system 150. Dialog manager 216 may not include the second user query and/or the corresponding response in training data 206 provided to train and/or retrain open domain dialog system 150. in view of the second privacy status (e.g., the high privacy level) determined for the second user query. Accordingly, the second user query and/or the corresponding response may not be used to obtain responses to future queries provided to platform 120 using open domain dialog system 150, as described herein.

In additional or alternative embodiments, dialog manager 216 can include the second user query and/or the corresponding response in an additional training data set that is associated with the closed domain dialog system 160 that provided the response. In such embodiments, dialog manager 216 can provide the additional training data set to the closed domain dialog system 160 and/or to a predictive system 180 associated with the closed domain dialog system 160 to be used to train/retrain the machine learning models associated with the closed domain dialog system 160, as described herein.

Figure 5:
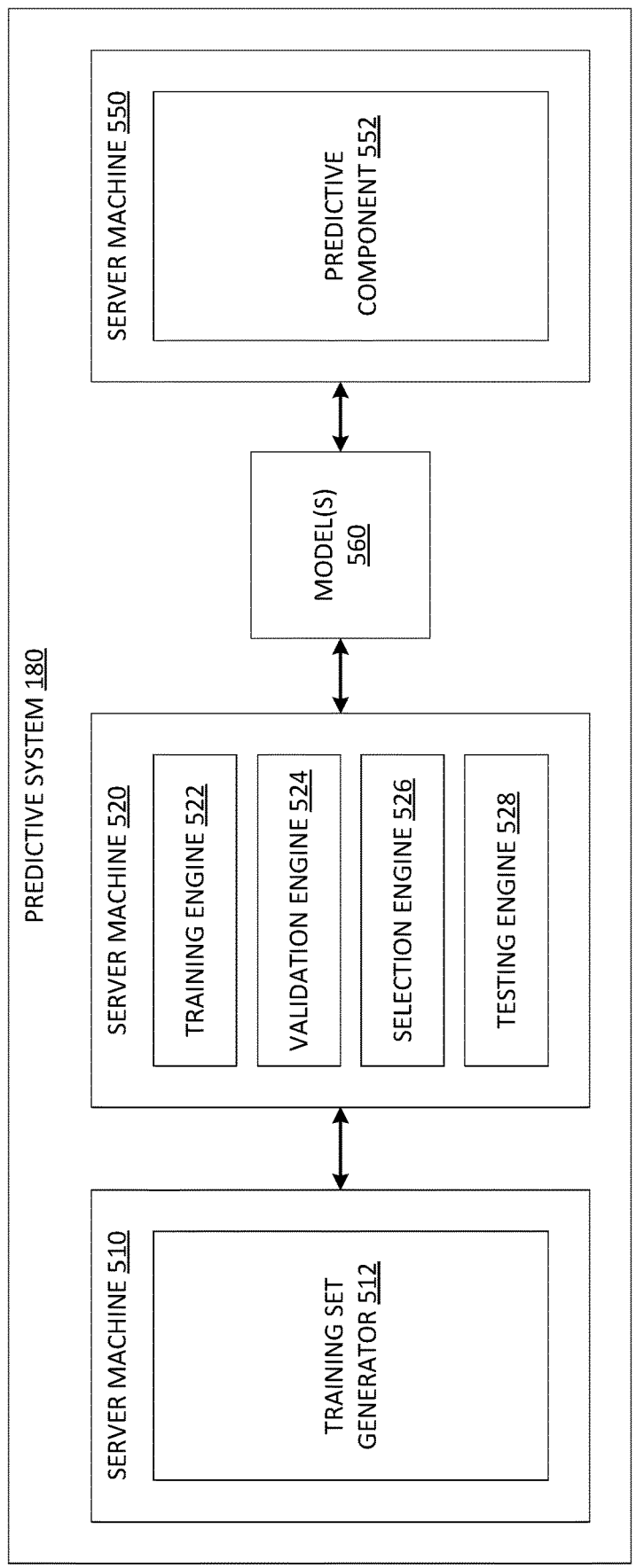
FIG. 5 is a block diagram that includes an example predictive system, according to at least one embodiment.

FIG. 5 is a block diagram that includes an example predictive system 180, according to aspects of the present disclosure. In some embodiments, predictive system 180 can be configured to train one or more machine learning models 560 associated with open domain dialog system 150. In additional or alternative embodiments, predictive system 180 can be configured to train one or more machine learning models 560 associated with a closed domain dialog system 150. It should be noted that although some embodiments and examples are described with respect to training/retraining the machine learning models 560 associated with open domain dialog system 150, embodiments and examples can be applied to train/retrain machine learning models 560 associated with closed domain dialog system 160.

As illustrated in FIG. 5, predictive system 180 can include a training set generator 512 (e.g., residing at server machine 510), a training engine 512, a validation engine 524, a selection engine 526, and/or a testing engine 528 (e.g., each residing at server machine 520), and/or a predictive component 552 (e.g., residing at server machine 550). Training set generator 512 may be capable of generating training data (e.g., a set of training inputs and a set of target outputs) to train model 560. Machine learning models 560 can include one or more LLMs, as described above, or any other type of machine learning model that is trained to perform tasks of user queries, as described herein.

As mentioned above, training set generator 512 can generate training data for training model 560. In an illustrative example, training set generator 512 can generate training data to a model associated with open domain dialog system 150. In such example, training set generator 512 can initialize a training set T to null (e.g., { }). Training set generator 512 can obtain data associated with one or more user-provided queries to platform 120 and/or one or more responses to the queries. In some embodiments, training set generator 512 can obtain the data associated with the user provided queries and/or the response based on training data 206 received from dialog manager 216, as described above. Training set generator 512 can generate an input/output mapping. The input can be based on a user-provided query of training data 206 and the output can indicate the response to the user-provided query (e.g., obtained from open domain dialog system 150). Training set generator 512 can add the input/output mapping to the training set T and can determine whether training set T is sufficient for training model 560. Training set T can be sufficient for training model 560 if training set T includes a threshold amount of input/output mappings, in some embodiments. In response to determining that training set T is not sufficient for training, training set generator 512 can identify additional data that indicates additional phrases provided by users of platform 120 ad can generate additional input/output mappings based on the additional data. In response to determining that training set T is sufficient for training, training set generator 512 can provide training set T to train model 560. In some embodiments, training set generator 512 provides the training set T to training engine 522.

Training engine 522 can train a machine learning model 560 using the training data (e.g., training set T) from training set generator 512. The machine learning model 560 can refer to the model artifact that is created by the training engine 522 using the training data that includes training inputs and/or corresponding target outputs (correct answers for respective training inputs). The training engine 522 can find patterns in the training data that map the training input to the target output (the answer to be predicted), and provide the machine learning model 560 that captures these patterns. The machine learning model 560 can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model may be trained by, for example, adjusting weights of a neural network in accordance with a backpropagation learning algorithm or the like. In one aspect, the training set is obtained by training set generator 512 hosted by server machine 510.

Validation engine 524 may be capable of validating a trained machine learning model 560 using a corresponding set of features of a validation set from training set generator 512. The validation engine 524 may determine an accuracy of each of the trained machine learning models 560 based on the corresponding sets of features of the validation set. The validation engine 524 may discard a trained machine learning model 560 that has an accuracy that does not meet a threshold accuracy. In some embodiments, the selection engine 526 may be capable of selecting a trained machine learning model 560 that has an accuracy that meets a threshold accuracy. In some embodiments, the selection engine 526 may be capable of selecting the trained machine learning model 560 that has the highest accuracy of the trained machine learning models 560.

The testing engine 528 may be capable of testing a trained machine learning model 560 using a corresponding set of features of a testing set from training set generator 512. For example, a first trained machine learning model 560 that was trained using a first set of features of the training set may be tested using the first set of features of the testing set. The testing engine 528 may determine a trained machine learning model 560 that has the highest accuracy of all of the trained machine learning models based on the testing sets.

As described above, predictive system 180 can be configured to train a large language model. It should be noted that predictive system 180 can train the large language model in accordance with embodiments described herein and/or in accordance with other techniques for training a large language model. For example, large language model may be trained on a large amount of data, including prediction of one or more missing words in a sentence, identification of whether two consecutive sentences are logically related to each other, generation of next texts based on prompts, etc.

Predictive component 552 of server machine 550 may be configured to feed data as input to model 560 and obtain one or more outputs. As described above, model 560 can correspond to a LLM associated with open domain dialog system 150, in some embodiments. In such embodiments, predictive component 552 (e.g., residing at or otherwise connected to query identifier 214 of virtual meeting manager 152) can feed queries 202 and/or text queries 414 as input to the LLM associated with open domain dialog system 150 and obtain one or more outputs, which indicate a 204 response to the 202 query.

Figure 6:
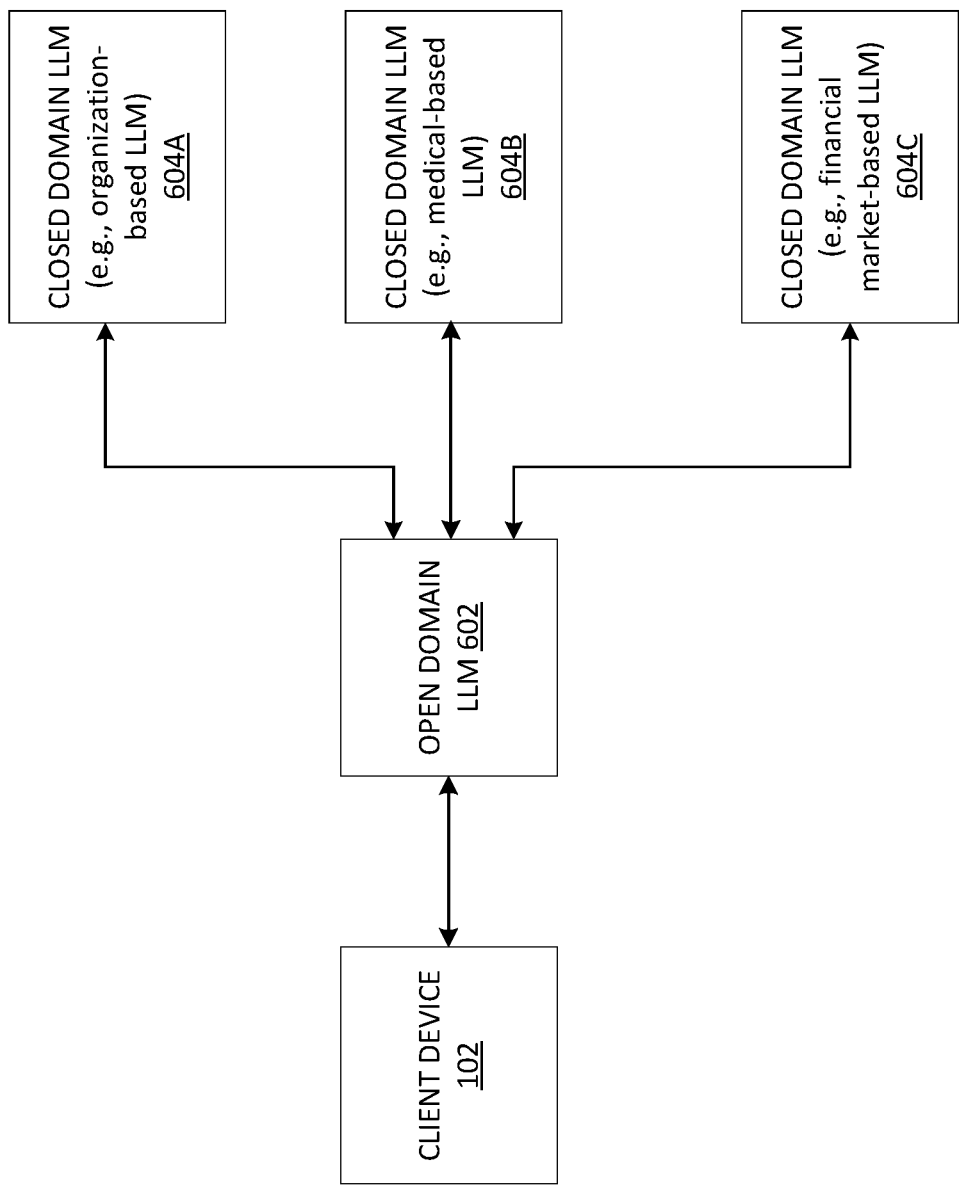
FIG. 6 depicts example large language models (LLMs), according to at least one embodiment.

FIG. 6 depicts example large language models (LLMs) associated with closed domain dialog systems 160, according to aspects of the present disclosure. In some embodiments, platform 120 can provide client device 102 with access to a web-based application that enables a user of client device 102 to provide queries to a LLM associated with open domain dialog system 160. Such LLM is depicted as open domain LLM 602. In an illustrative example, the user of client device 102 may intend to only engage in a dialog with open domain LLM 602 and may be unaware of one or more closed domain dialog systems 160 associated with LLMs that perform tasks associated with specific topics. The user can provide a query for the open domain LLM 602 using client device 102, as described above. In some embodiments, domain manager 216 can determine that the query is associated with a privacy status that is associated with the one or more closed domain LLMs 604 and can identify an appropriate closed domain LLM 604 that is trained to perform the tasks associated with the context of the query, as described above. In an illustrative example, domain manager 216 can determine the context associated with the query relates to an organization associated with the user and/or client device 102. Accordingly, domain manager 216 can identify closed domain LLM 604A to forward the query, as described above. In another illustrative example, domain manager 216 can determine the context associated with the query relates to the medical field and/or the financial market field. Accordingly, domain manager 216 can identify closed domain LLM 604B and/or closed domain LLM 604C to forward the query. Closed domain LLMs 604 can each be associated with a particular privacy status, in accordance with embodiments of the present disclosure.

FIG. 7 depicts an example dialog exchange, according to aspects of the present disclosure. In some embodiments, a user-provided query can include multiple requests that each have different contexts and/or are associated with different privacy statuses. For example, a user can provide the following query using the user interface of client device 102: "I'd like to create a digital avatar with the ability to translate between English and Spanish. What are the steps and how much would it cost me if I expect no more than 200 requests per day?" Dialog manager 216 can identify three distinct requests associated with the query, which include a first request to create a digital avatar, a second request to enable the digital avatar to translate between English and Spanish, and a third request of how much it would cost for the digital avatar to service 200 requests per day. Dialog manager 216 can determine that the first and second requests have a context associated with the organization associated with the user and, accordingly, can determine to forward the query to the closed domain dialog system 604A. Dialog manager 216 can also determine that the third request has a context associated with the financial market field and, accordingly, can determine to forward the query to closed domain dialog system 604C.

As illustrated in FIG. 7, dialog manager 216 can provide a response to the user query that includes responses obtained from closed domain dialog system 604A and closed domain dialog system 604C. For example, the response to the user query can include a first response 702 obtained from closed domain dialog system 604A and a second response 704 obtained from closed domain dialog system 604B.

As further illustrated in FIG. 7, the user can provide a follow up query (e.g., upon receiving the response to the initial query from platform 120). For example, the user can provide a follow up query of: "Are there any medical best practices that I should incorporate if my avatar needs to engage with someone who is speech impaired or hearing impaired?" Dialog manager 216 can identify one or more requests based on the follow up query and can determine that each of the one or more requests correspond to the medical field. Accordingly, dialog manager 216 can forward the requests to closed domain dialog system 604B. As illustrated in FIG. 7, dialog manager 716 can provide a response to the follow up user query that includes responses obtained from closed domain dialog system 604B (e.g., response 706 and/or response 708).

Inference and Training Logic

Figure 8A:
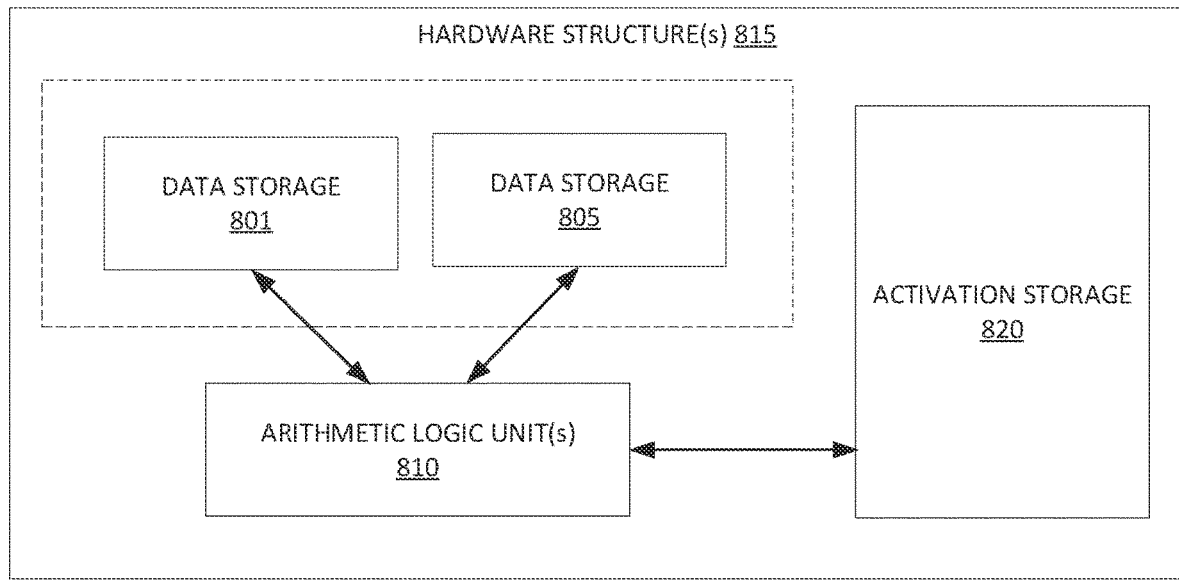
FIG. 8A illustrates inference and/or training logic, according to at least one embodiment.

FIG. 8A illustrates hardware structure(s) 815 for inference and/or training logic used to perform inferencing and/or training operations associated with one or more embodiments. Details regarding inference and/or training logic are provided below in conjunction with FIGS. 8A and/or 8B.

In at least one embodiment, hardware structure(s) 815 for inference and/or training logic may include, without limitation, code and/or data storage 801 to store forward and/or output weight and/or input/output data, and/or other parameters to configure neurons or layers of a neural network trained and/or used for inferencing in aspects of one or more embodiments. In at least one embodiment, training logic may include, or be coupled to code and/or data storage 801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 801 may be included with other on-chip or off-chip data storage, including a processor's L1, L2, or L3 cache or system memory.

In at least one embodiment, any portion of code and/or data storage 801 may be internal or external to one or more processors or other hardware logic devices or circuits. In at least one embodiment, code and/or code and/or data storage 801 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, hardware structure(s) 815 for inference and/or training logic may include, without limitation, a code and/or data storage 805 to store backward and/or output weight and/or input/output data corresponding to neurons or layers of a neural network trained and/or used for inferencing in aspects of one or more embodiments. In at least one embodiment, code and/or data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage 805 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment, any portion of code and/or data storage 805 may be included with other on-chip or off-chip data storage, including a processor's L1, L2, or L3 cache or system memory. In at least one embodiment, any portion of code and/or data storage 805 may be internal or external to on one or more processors or other hardware logic devices or circuits. In at least one embodiment, code and/or data storage 805 may be cache memory, DRAM, SRAM, non-volatile memory (e.g., Flash memory), or other storage. In at least one embodiment, choice of whether code and/or data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 801 and code and/or data storage 805 may be separate storage structures. In at least one embodiment, code and/or data storage 801 and code and/or data storage 805 may be same storage structure. In at least one embodiment, code and/or data storage 801 and code and/or data storage 805 may be partially same storage structure and partially separate storage structures. In at least one embodiment, any portion of code and/or data storage 801 and code and/or data storage 805 may be included with other on-chip or off-chip data storage, including a processor's L1, L2, or L3 cache or system memory.

In at least one embodiment, hardware structure(s) 815 for inference and/or training logic may include, without limitation, one or more arithmetic logic unit(s) ("ALU(s)") 810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 820 that are functions of input/output and/or weight parameter data stored in code and/or data storage 801 and/or code and/or data storage 805. In at least one embodiment, activations stored in activation storage 820 are generated according to linear algebraic and or matrix-based mathematics performed by ALU(s) 810 in response to performing instructions or other code, wherein weight values stored in code and/or data storage 805 and/or code and/or data storage 801 are used as operands along with other values, such as bias values, gradient information, momentum values, or other parameters or hyperparameters, any or all of which may be stored in code and/or data storage 805 or code and/or data storage 801 or another storage on or off-chip.

In at least one embodiment, ALU(s) 810 are included within one or more processors or other hardware logic devices or circuits, whereas in another embodiment, ALU(s) 810 may be external to a processor or other hardware logic device or circuit that uses them (e.g., a co-processor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 801, code and/or data storage 805, and activation storage 820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., Flash memory), or other storage. In at least one embodiment, activation storage 820 may be completely or partially within or external to one or more processors or other logical circuits. In at least one embodiment, choice of whether activation storage 820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic described with respect to in FIG. 8A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit ("CPU") hardware, graphics processing unit ("GPU") hardware or other hardware, such as field programmable gate arrays ("FPGAs").

Figure 8B:
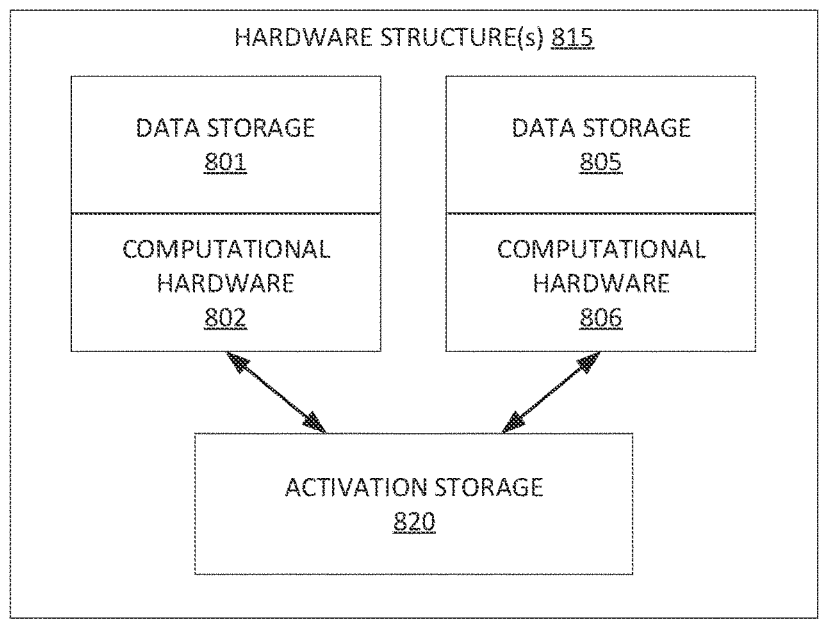
FIG. 8B illustrates inference and/or training logic, according to at least one embodiment.

FIG. 8B illustrates hardware structure(s) 815 for inference and/or training logic, according to at least one or more embodiments. In at least one embodiment, hardware structure(s) 815 may include, without limitation, hardware logic in which computational resources are dedicated or otherwise exclusively used in conjunction with weight values or other information corresponding to one or more layers of neurons within a neural network. In at least one embodiment, inference and/or training logic may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic may be used in conjunction with central processing unit (CPU) hardware, graphics processing unit (GPU) hardware or other hardware, such as field programmable gate arrays (FPGAs).

In at least one embodiment, hardware structure(s) 815 for inference and/or training logic includes, without limitation, code and/or data storage 801 and code and/or data storage 805, which may be used to store code (e.g., graph code), weight values and/or other information, including bias values, gradient information, momentum values, and/or other parameter or hyperparameter information. In at least one embodiment illustrated in FIG. 8B, each of code and/or data storage 801 and code and/or data storage 805 is associated with a dedicated computational resource, such as computational hardware 802 and computational hardware 806, respectively. In at least one embodiment, each of computational hardware 802 and computational hardware 806 comprises one or more ALUs that perform mathematical functions, such as linear algebraic functions, only on information stored in code and/or data storage 801 and code and/or data storage 805, respectively, result of which is stored in activation storage 820.

In at least one embodiment, each of code and/or data storage 801 and 805 and corresponding computational hardware 802 and 806, respectively, correspond to different layers of a neural network, such that resulting activation from one "storage/computational pair 801/802" of code and/or data storage 801 and computational hardware 802 is provided as an input to "storage/computational pair 805/806" of code and/or data storage 805 and computational hardware 806, in order to mirror conceptual organization of a neural network. In at least one embodiment, each of storage/computational pairs 801/702 and 805/806 may correspond to more than one neural network layer. In at least one embodiment, additional storage/computation pairs (not shown) subsequent to or in parallel with storage computation pairs 801/802 and 805/806 may be included in inference and/or training logic.

Data Center

FIG. 9 illustrates an example data center 900, in which at least one embodiment may be used. In at least one embodiment, data center 900 includes a data center infrastructure layer 910, a framework layer 920, a software layer 930, and an application layer 940.

In at least one embodiment, as shown in FIG. 9, data center infrastructure layer 910 may include a resource orchestrator 912, grouped computing resources 914, and node computing resources ("node C.R.s") 916(1)-1016(N), where "N" represents any whole, positive integer. In at least one embodiment, node C.R.s 916(1)-1016(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-1016(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-1016(N) and/or grouped computing resources 914. In at least one embodiment, resource orchestrator 912 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 922, a configuration manager 924, a resource manager 926 and a distributed file system 928. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 928 for large-scale data processing (e.g., "big data"). In at least one embodiment, job scheduler 922 may include a Spark driver to facilitate scheduling of workloads supported by various layers of data center 900. In at least one embodiment, configuration manager 924 may be capable of configuring different layers such as software layer 930 and framework layer 920 including Spark and distributed file system 928 for supporting large-scale data processing. In at least one embodiment, resource manager 926 may be capable of managing clustered or grouped computing resources mapped to or allocated for support of distributed file system 928 and job scheduler 922. In at least one embodiment, clustered or grouped computing resources may include grouped computing resource 914 at data center infrastructure layer 910. In at least one embodiment, resource manager 926 may coordinate with resource orchestrator 912 to manage these mapped or allocated computing resources.

In at least one embodiment, software 932 included in software layer 930 may include software used by at least portions of node C.R.s 916(1)-1016(N), grouped computing resources 914, and/or distributed file system 928 of framework layer 920. The one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-1016 (N), grouped computing resources 914, and/or distributed file system 928 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 924, resource manager 926, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic of hardware structure(s) 815 are used to perform inferencing and/or training operations associated with one or more embodiments. Details regarding inference and/or training logic of hardware structure(s) 815 are provided herein in conjunction with FIGS. 8A and/or 8B. In at least one embodiment, inference and/or training logic of hardware structure(s) 815 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 10:
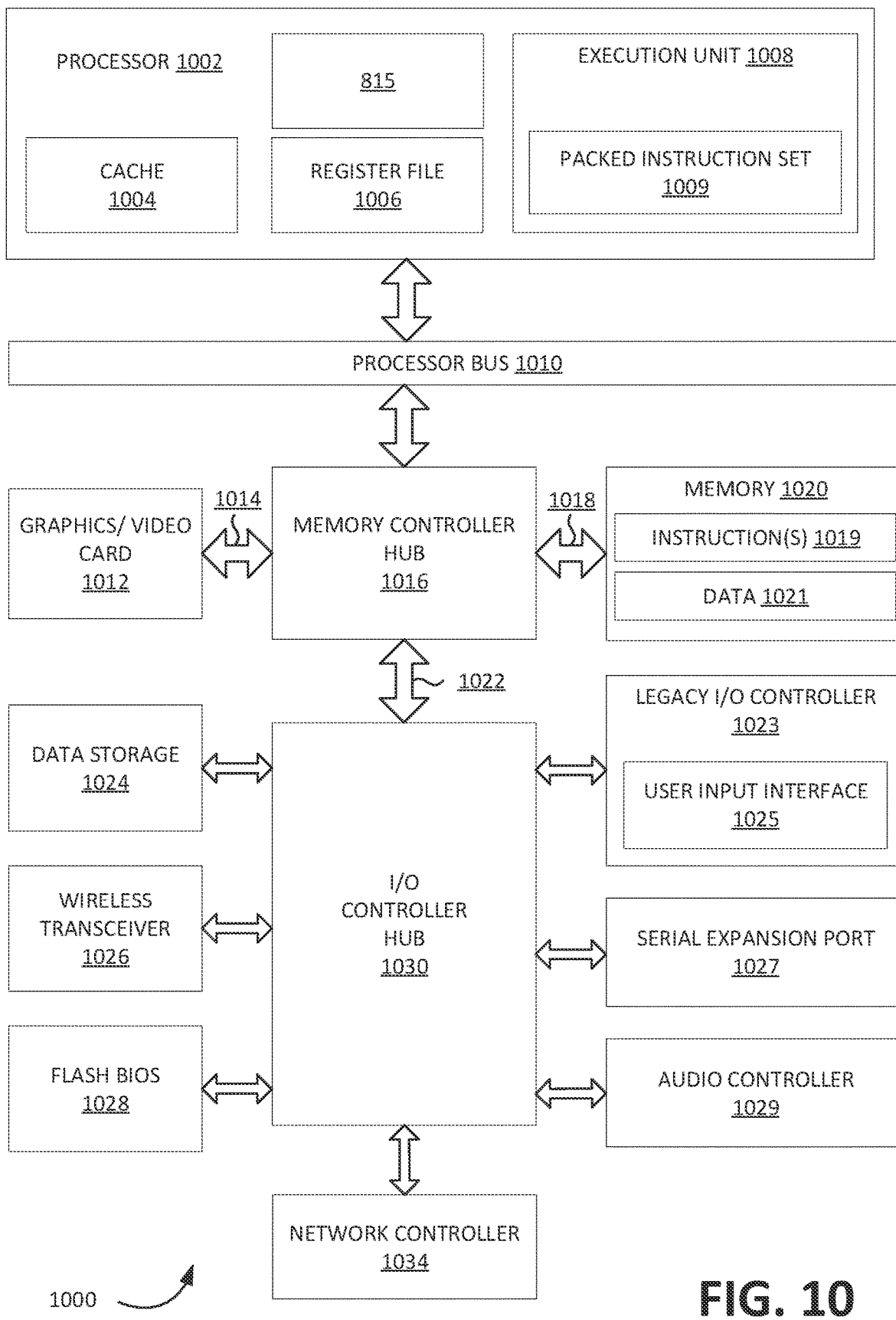
FIG. 10 illustrates a computer system, according to at least one embodiment.

FIG. 10 is a block diagram illustrating an exemplary computer system, which may be a system with interconnected devices and components, a system-on-a-chip (SOC) or some combination thereof 1000 formed with a processor that may include execution units to execute an instruction, according to at least one embodiment. In at least one embodiment, computer system 1000 may include, without limitation, a component, such as a processor 1002 to employ execution units including logic to perform algorithms for process data, in accordance with present disclosure, such as in embodiment described herein. In at least one embodiment, computer system 1000 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1000 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 1000 may include, without limitation, processor 1002 that may include, without limitation, one or more execution units 1008 to perform machine learning model training and/or inferencing according to techniques described herein. In at least one embodiment, computer system 1000 is a single processor desktop or server system, but in another embodiment computer system 1000 may be a multiprocessor system. In at least one embodiment, processor 1002 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1002 may be coupled to a processor bus 1010 that may transmit data signals between processor 1002 and other components in computer system 1000.

In at least one embodiment, processor 1002 may include, without limitation, a Level 1 ("L1") internal cache memory ("cache") 1004. In at least one embodiment, processor 1002 may have a single internal cache or multiple levels of internal cache. In at least one embodiment, cache memory may reside external to processor 1002. Other embodiments may also include a combination of both internal and external caches depending on particular implementation and needs. In at least one embodiment, register file 1006 may store different types of data in various registers including, without limitation, integer registers, floating point registers, status registers, and instruction pointer register.

In at least one embodiment, execution unit 1008, including, without limitation, logic to perform integer and floating point operations, also resides in processor 1002. In at least one embodiment, processor 1002 may also include a microcode ("ucode") read only memory ("ROM") that stores microcode for certain macro instructions. In at least one embodiment, execution unit 1008 may include logic to handle a packed instruction set 1009. In at least one embodiment, by including packed instruction set 1009 in an instruction set of a general-purpose processor 1002, along with associated circuitry to execute instructions, operations used by many multimedia applications may be performed using packed data in a general-purpose processor 1002. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1008 may also be used in microcontrollers, embedded processors, graphics devices, DSPs, and other types of logic circuits. In at least one embodiment, computer system 1000 may include, without limitation, a memory 1020. In at least one embodiment, memory 1020 may be implemented as a Dynamic Random Access Memory ("DRAM") device, a Static Random Access Memory ("SRAM") device, flash memory device, or other memory device. In at least one embodiment, memory 1020 may store instruction(s) 1019 and/or data 1021 represented by data signals that may be executed by processor 1002.

In at least one embodiment, system logic chip may be coupled to processor bus 1010 and memory 1020. In at least one embodiment, system logic chip may include, without limitation, a memory controller hub ("MCH") 1016, and processor 1002 may communicate with MCH 1016 via processor bus 1010. In at least one embodiment, MCH 1016 may provide a high bandwidth memory path 1018 to memory 1020 for instruction and data storage and for storage of graphics commands, data and textures. In at least one embodiment, MCH 1016 may direct data signals between processor 1002, memory 1020, and other components in computer system 1000 and to bridge data signals between processor bus 1010, memory 1020, and a system I/O 1022. In at least one embodiment, system logic chip may provide a graphics port for coupling to a graphics controller. In at least one embodiment, MCH 1016 may be coupled to memory 1020 through a high bandwidth memory path 1018 and graphics/video card 1012 may be coupled to MCH 1016 through an Accelerated Graphics Port ("AGP") interconnect 1014.

In at least one embodiment, computer system 1000 may use system I/O 1022 that is a proprietary hub interface bus to couple MCH 1016 to I/O controller hub ("ICH") 1030. In at least one embodiment, ICH 1030 may provide direct connections to some I/O devices via a local I/O bus. In at least one embodiment, local I/O bus may include, without limitation, a high-speed I/O bus for connecting peripherals to memory 1020, chipset, and processor 1002. Examples may include, without limitation, an audio controller 1029, a firmware hub ("flash BIOS") 1028, a wireless transceiver 1026, a data storage 1024, a legacy I/O controller 1023 containing user input and keyboard interfaces 1025, a serial expansion port 1027, such as Universal Serial Bus ("USB"), and a network controller 1034, which may include in some embodiments, a data processing unit. Data storage 1024 may comprise a hard disk drive, a floppy disk drive, a CD-ROM device, a flash memory device, or other mass storage device.

In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1000 are interconnected using compute express link (CXL) interconnects.

Inference and/or training logic of hardware structure(s) 815 are used to perform inferencing and/or training operations associated with one or more embodiments. Details regarding inference and/or training logic of hardware structure(s) 815 are provided herein in conjunction with FIGS. 8A and/or 8B. In at least one embodiment, inference and/or training logic of hardware structure(s) 815 may be used in system FIG. 10 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 11:
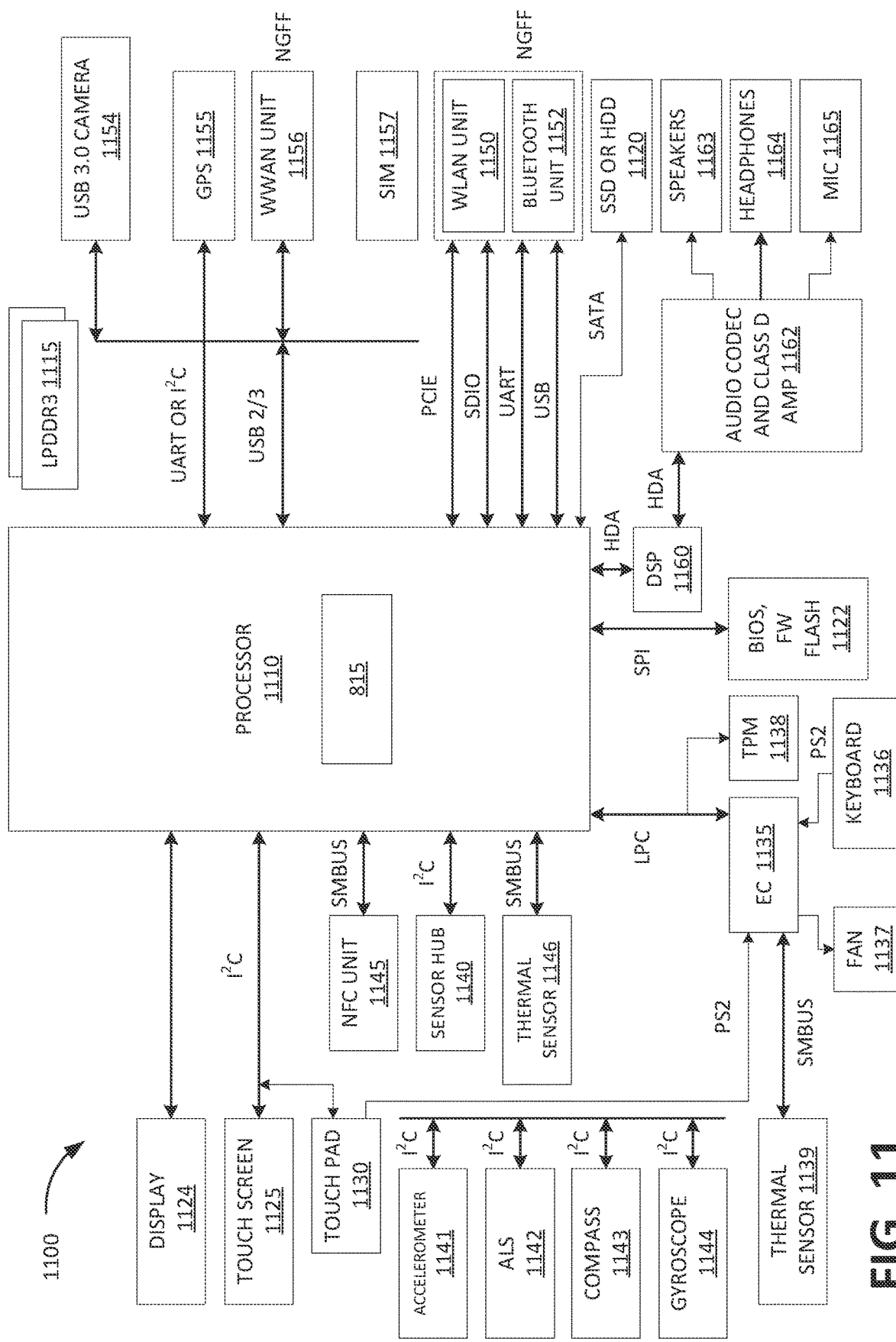
FIG. 11 illustrates a computer system, according to at least one embodiment.

FIG. 11 is a block diagram illustrating an electronic device 1100 for utilizing a processor 1110, according to at least one embodiment. In at least one embodiment, electronic device 1100 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 1100 may include, without limitation, processor 1110 communicatively coupled to any suitable number or kind of components, peripherals, modules, or devices. In at least one embodiment, processor 1110 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 11 illustrates a system, which includes interconnected hardware devices or "chips", whereas in other embodiments, FIG. 11 may illustrate an exemplary System on a Chip ("SoC"). In at least one embodiment, devices illustrated in FIG. 11 may be interconnected with proprietary interconnects, standardized interconnects (e.g., PCIe) or some combination thereof. In at least one embodiment, one or more components of FIG. 11 are interconnected using compute express link (CXL) interconnects.

In at least one embodiment, FIG. 11 may include a display 1124, a touch screen 1125, a touch pad 1130, a Near Field Communications unit ("NFC") 1145, a sensor hub 1140, a thermal sensor 1146, an Express Chipset ("EC") 1135, a Trusted Platform Module ("TPM") 1138, BIOS/firmware/flash memory ("BIOS, FW Flash") 1122, a DSP 1160, a drive 1120 such as a Solid State Disk ("SSD") or a Hard Disk Drive ("HDD"), a wireless local area network unit ("WLAN") 1150, a Bluetooth unit 1152, a Wireless Wide Area Network unit ("WWAN") 1156, a Global Positioning System (GPS) 1155, a camera ("USB 3.0 camera") 1154 such as a USB 3.0 camera, and/or a Low Power Double Data Rate ("LPDDR") memory unit ("LPDDR3") 1115 implemented in, for example, LPDDR3 standard. These components may each be implemented in any suitable manner.

In at least one embodiment, other components may be communicatively coupled to processor 1110 through components discussed above. In at least one embodiment, an accelerometer 1141, Ambient Light Sensor ("ALS") 1142, compass 1143, and a gyroscope 1144 may be communicatively coupled to sensor hub 1140. In at least one embodiment, thermal sensor 1139, a fan 1137, a keyboard 1136, and a touch pad 1130 may be communicatively coupled to EC 1135. In at least one embodiment, speaker 1163, headphones 1164, and microphone ("mic") 1165 may be communicatively coupled to an audio unit ("audio codec and class d amp") 1162, which may in turn be communicatively coupled to DSP 1160. In at least one embodiment, audio unit 1164 may include, for example and without limitation, an audio coder/decoder ("codec") and a class D amplifier. In at least one embodiment, SIM card ("SIM") 1157 may be communicatively coupled to WWAN unit 1156. In at least one embodiment, components such as WLAN unit 1150 and Bluetooth unit 1152, as well as WWAN unit 1156 may be implemented in a Next Generation Form Factor ("NGFF").

Inference and/or training logic of hardware structure(s) 815 are used to perform inferencing and/or training operations associated with one or more embodiments. Details regarding inference and/or training logic of hardware structure(s) 815 are provided herein in conjunction with FIGS. 8A and/or 8B. In at least one embodiment, inference and/or training logic of hardware structure(s) 815 may be used in system FIG. 11 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 12:
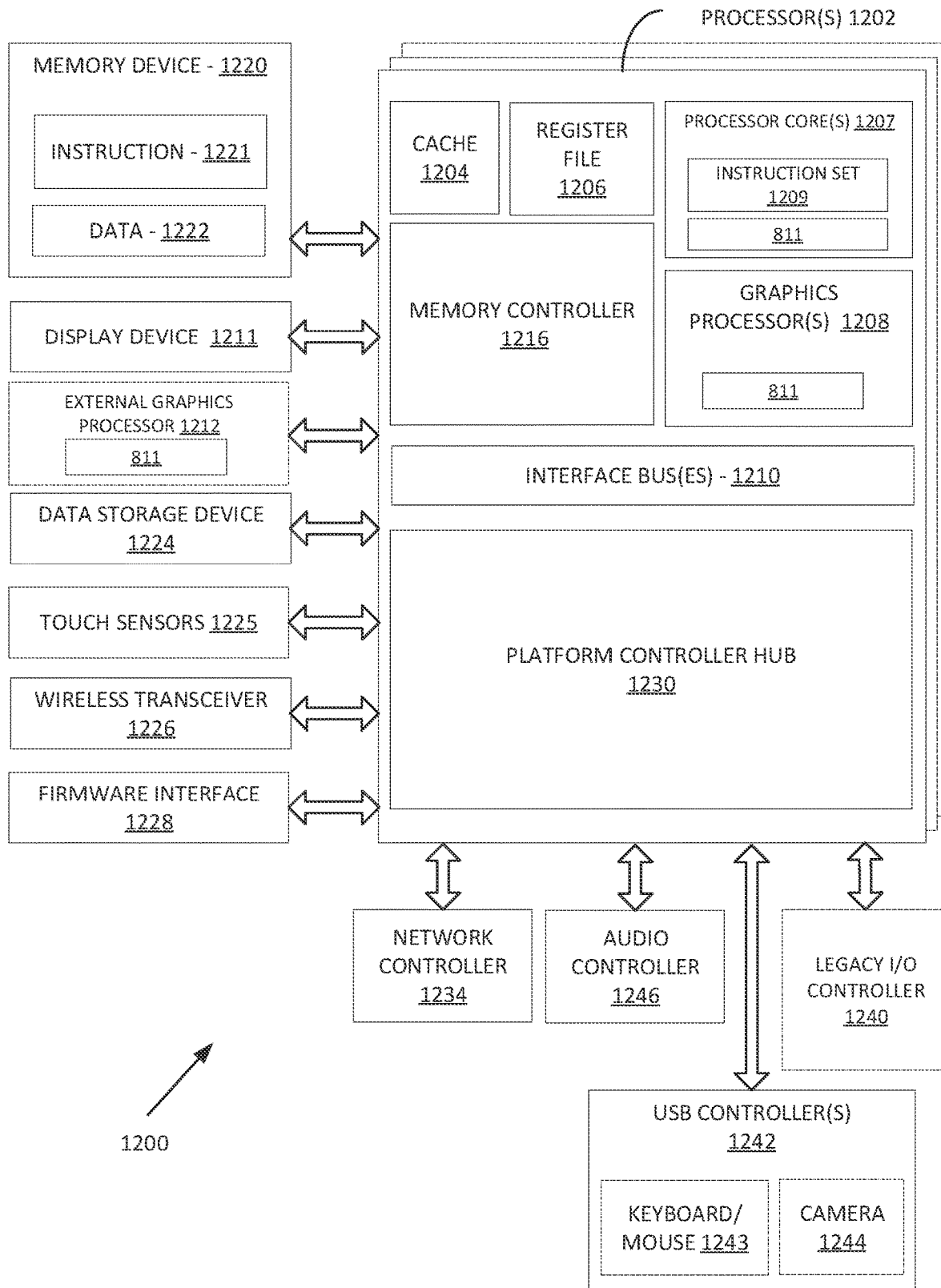
FIG. 12 illustrates at least portions of a graphics processor, according to one or more embodiments.

FIG. 12 is a block diagram of a processing system, according to at least one embodiment. In at least one embodiment, system 1200 includes one or more processors 1202 and one or more graphics processors 1208, and may be a single processor desktop system, a multiprocessor workstation system, or a server system having a large number of processors 1202 or processor cores 1207. In at least one embodiment, system 1200 is a processing platform incorporated within a system-on-a-chip (SoC) integrated circuit for use in mobile, handheld, edge, or embedded devices.

In at least one embodiment, system 1200 may include, or be incorporated within a server-based gaming platform, a game console, including a game and media console, a mobile gaming console, a handheld game console, or an online game console. In at least one embodiment, system 1200 is a mobile phone, smart phone, tablet computing device or mobile Internet device. In at least one embodiment, processing system 1200 may also include, couple with, or be integrated within a wearable device, such as a smart watch wearable device, smart eyewear device, augmented reality device, or virtual reality device. In at least one embodiment, processing system 1200 is a television or set top box device having one or more processors 1202 and a graphical interface generated by one or more graphics processors 1208.

In at least one embodiment, one or more processors 1202 each include one or more processor cores 1207 to process instructions which, when executed, perform operations for system and user software. In at least one embodiment, each of one or more processor cores 1207 is configured to process a specific instruction set 1209. In at least one embodiment, instruction set 1209 may facilitate Complex Instruction Set Computing (CISC), Reduced Instruction Set Computing (RISC), or computing via a Very Long Instruction Word (VLIW). In at least one embodiment, processor cores 1207 may each process a different instruction set 1209, which may include instructions to facilitate emulation of other instruction sets. In at least one embodiment, processor core 1207 may also include other processing devices, such a Digital Signal Processor (DSP).

In at least one embodiment, processor 1202 includes cache memory 1204. In at least one embodiment, processor 1202 may have a single internal cache or multiple levels of internal cache. In at least one embodiment, cache memory is shared among various components of processor 1202. In at least one embodiment, processor 1202 also uses an external cache (e.g., a Level-3 (L3) cache or Last Level Cache (LLC)) (not shown), which may be shared among processor cores 1207 using known cache coherency techniques. In at least one embodiment, register file 1206 is additionally included in processor 1202 which may include different types of registers for storing different types of data (e.g., integer registers, floating point registers, status registers, and an instruction pointer register). In at least one embodiment, register file 1206 may include general-purpose registers or other registers.

In at least one embodiment, one or more processor(s) 1202 are coupled with one or more interface bus(es) 1210 to transmit communication signals such as address, data, or control signals between processor 1202 and other components in system 1200. In at least one embodiment, interface bus 1210, in one embodiment, may be a processor bus, such as a version of a Direct Media Interface (DMI) bus. In at least one embodiment, interface 1210 is not limited to a DMI bus, and may include one or more Peripheral Component Interconnect buses (e.g., PCI, PCI Express), memory busses, or other types of interface busses. In at least one embodiment processor(s) 1202 include an integrated memory controller 1216 and a platform controller hub 1230. In at least one embodiment, memory controller 1216 facilitates communication between a memory device and other components of system 1200, while platform controller hub (PCH) 1230 provides connections to I/O devices via a local I/O bus.

In at least one embodiment, memory device 1220 may be a dynamic random access memory (DRAM) device, a static random access memory (SRAM) device, flash memory device, phase-change memory device, or some other memory device having suitable performance to serve as process memory. In at least one embodiment memory device 1220 may operate as system memory for system 1200, to store data 1222 and instructions 1221 for use when one or more processors 1202 executes an application or process. In at least one embodiment, memory controller 1216 also couples with an optional external graphics processor 1212, which may communicate with one or more graphics processors 1208 in processors 1202 to perform graphics and media operations. In at least one embodiment, a display device 1211 may connect to processor(s) 1202. In at least one embodiment display device 1211 may include one or more of an internal display device, as in a mobile electronic device or a laptop device or an external display device attached via a display interface (e.g., DisplayPort, etc.). In at least one embodiment, display device 1211 may include a head mounted display (HMD) such as a stereoscopic display device for use in virtual reality (VR) applications or augmented reality (AR) applications.

In at least one embodiment, platform controller hub 1230 enables peripherals to connect to memory device 1220 and processor 1202 via a high-speed I/O bus. In at least one embodiment, I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). In at least one embodiment, data storage device 1224 may connect via a storage interface (e.g., SATA) or via a peripheral bus, such as a Peripheral Component Interconnect bus (e.g., PCI, PCI Express). In at least one embodiment, touch sensors 1225 may include touch screen sensors, pressure sensors, or fingerprint sensors. In at least one embodiment, wireless transceiver 1226 may be a Wi-Fi transceiver, a Bluetooth transceiver, or a mobile network transceiver such as a 3G, 4G, or Long Term Evolution (LTE) transceiver. In at least one embodiment, firmware interface 1228 enables communication with system firmware, and may be, for example, a unified extensible firmware interface (UEFI). In at least one embodiment, network controller 1234 may enable a network connection to a wired network. In at least one embodiment, a high-performance network controller (not shown) couples with interface bus 1210. In at least one embodiment, audio controller 1246 is a multi-channel high definition audio controller. In at least one embodiment, system 1200 includes an optional legacy I/O controller 1240 for coupling legacy (e.g., Personal System 2 (PS/2)) devices to system. In at least one embodiment, platform controller hub 1230 may also connect to one or more Universal Serial Bus (USB) controllers 1242 connect input devices, such as keyboard and mouse 1243 combinations, a camera 1244, or other USB input devices.

In at least one embodiment, an instance of memory controller 1216 and platform controller hub 1230 may be integrated into a discreet external graphics processor, such as external graphics processor 1212. In at least one embodiment, platform controller hub 1230 and/or memory controller 1216 may be external to one or more processor(s) 1202. For example, in at least one embodiment, system 1200 may include an external memory controller 1216 and platform controller hub 1230, which may be configured as a memory controller hub and peripheral controller hub within a system chipset that is in communication with processor(s) 1202.

Inference and/or training logic of hardware structure(s) 815 are used to perform inferencing and/or training operations associated with one or more embodiments. Details regarding inference and/or training logic of hardware structure(s) 815 are provided herein in conjunction with FIGS. 8A and/or 8B. In at least one embodiment portions or all of inference and/or training logic of hardware structure(s) 815 may be incorporated into graphics processor 1300. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 13:
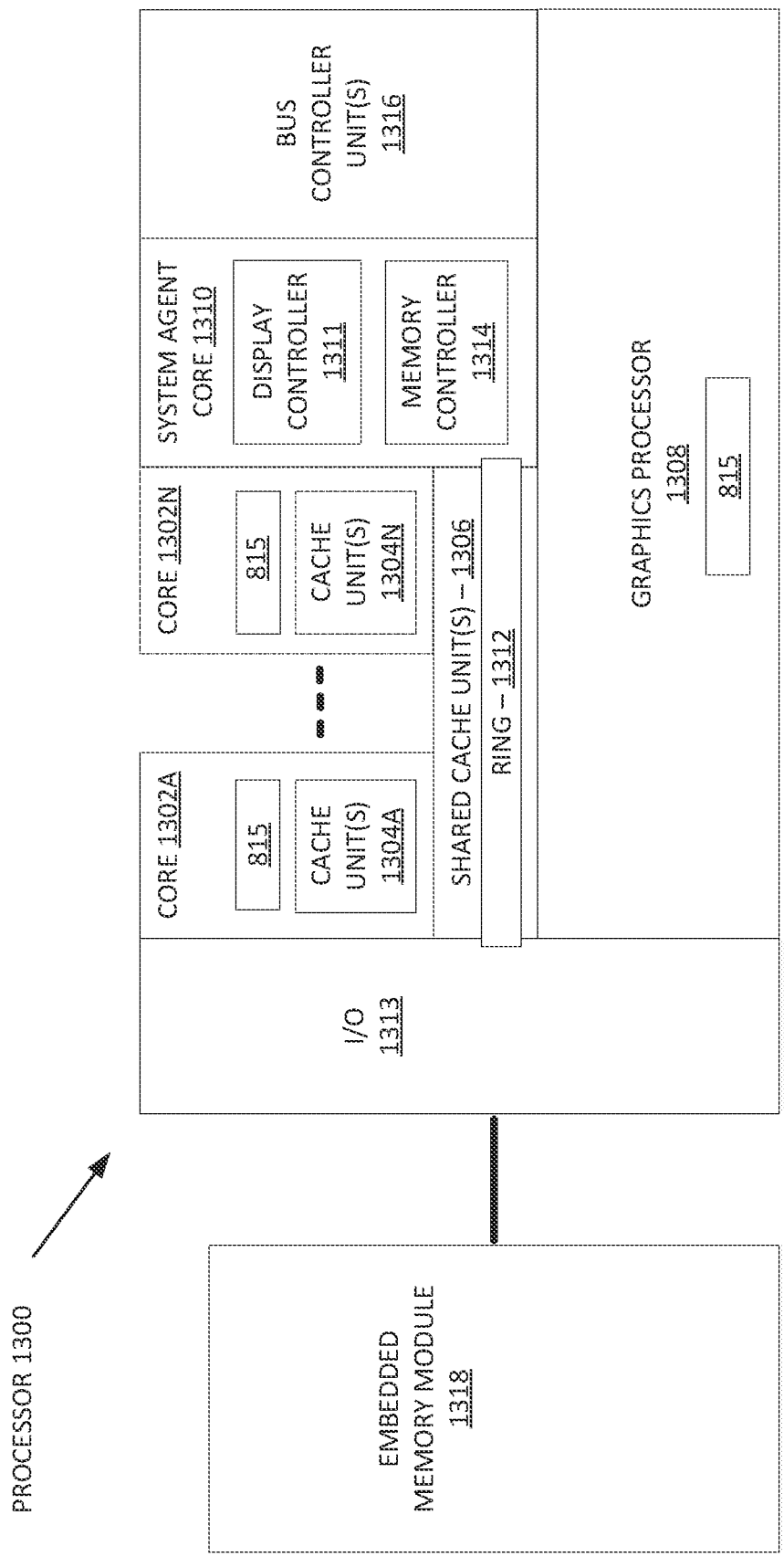
FIG. 13 illustrates at least portions of a graphics processor, according to one or more embodiments.

FIG. 13 is a block diagram of a processor 1300 having one or more processor cores 1302A-1402N, an integrated memory controller 1314, and an integrated graphics processor 1308, according to at least one embodiment. In at least one embodiment, processor 1300 may include additional cores up to and including additional core 1302N represented by dashed lined boxes. In at least one embodiment, each of processor cores 1302A-1402N includes one or more internal cache units 1304A-1404N. In at least one embodiment, each processor core also has access to one or more shared cached units 1306.

In at least one embodiment, internal cache units 1304A-1404N and shared cache units 1306 represent a cache memory hierarchy within processor 1300. In at least one embodiment, cache memory units 1304A-1404N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1306 and 1304A-1404N.

In at least one embodiment, processor 1300 may also include a set of one or more bus controller units 1316 and a system agent core 1310. In at least one embodiment, one or more bus controller units 1316 manage a set of peripheral buses, such as one or more PCI or PCI express busses. In at least one embodiment, system agent core 1310 provides management functionality for various processor components. In at least one embodiment, system agent core 1310 includes one or more integrated memory controllers 1314 to manage access to various external memory devices (not shown).

In at least one embodiment, one or more of processor cores 1302A-1402N include support for simultaneous multi-threading. In at least one embodiment, system agent core 1310 includes components for coordinating and operating cores 1302A-1402N during multi-threaded processing. In at least one embodiment, system agent core 1310 may additionally include a power control unit (PCU), which includes logic and components to regulate one or more power states of processor cores 1302A-1402N and graphics processor 1308.

In at least one embodiment, processor 1300 additionally includes graphics processor 1308 to execute graphics processing operations. In at least one embodiment, graphics processor 1308 couples with shared cache units 1306, and system agent core 1310, including one or more integrated memory controllers 1314. In at least one embodiment, system agent core 1310 also includes a display controller 1311 to drive graphics processor output to one or more coupled displays. In at least one embodiment, display controller 1311 may also be a separate module coupled with graphics processor 1308 via at least one interconnect, or may be integrated within graphics processor 1308.

In at least one embodiment, a ring based interconnect unit 1312 is used to couple internal components of processor 1300. In at least one embodiment, an alternative interconnect unit may be used, such as a point-to-point interconnect, a switched interconnect, or other techniques. In at least one embodiment, graphics processor 1308 couples with ring interconnect 1312 via an I/O link 1313.

In at least one embodiment, I/O link 1313 represents at least one of multiple varieties of I/O interconnects, including an on package I/O interconnect which facilitates communication between various processor components and a high-performance embedded memory module 1318, such as an eDRAM module. In at least one embodiment, each of processor cores 1302A-1402N and graphics processor 1308 use embedded memory modules 1318 as a shared Last Level Cache.

In at least one embodiment, processor cores 1302A-1402N are homogenous cores executing a common instruction set architecture. In at least one embodiment, processor cores 1302A-1402N are heterogeneous in terms of instruction set architecture (ISA), where one or more of processor cores 1302A-1402N execute a common instruction set, while one or more other cores of processor cores 1302A-1402N executes a subset of a common instruction set or a different instruction set. In at least one embodiment, processor cores 1302A-1402N are heterogeneous in terms of microarchitecture, where one or more cores having a relatively higher power consumption couple with one or more power cores having a lower power consumption. In at least one embodiment, processor 1300 may be implemented on one or more chips or as an SoC integrated circuit.

Inference and/or training logic of hardware structure(s) 815 are used to perform inferencing and/or training operations associated with one or more embodiments. Details regarding inference and/or training logic of hardware structure(s) 815 are provided herein in conjunction with FIGS. 8A and/or 8B. In at least one embodiment portions or all of inference and/or training logic of hardware structure(s) 815 may be incorporated into processor 1300. For example, in at least one embodiment, training and/or inferencing techniques described herein may use one or more of ALUs embodied in graphics processor 1308, graphics core(s) 1302A-1402N, or other components in FIG. 13. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of graphics processor 1300 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 14:
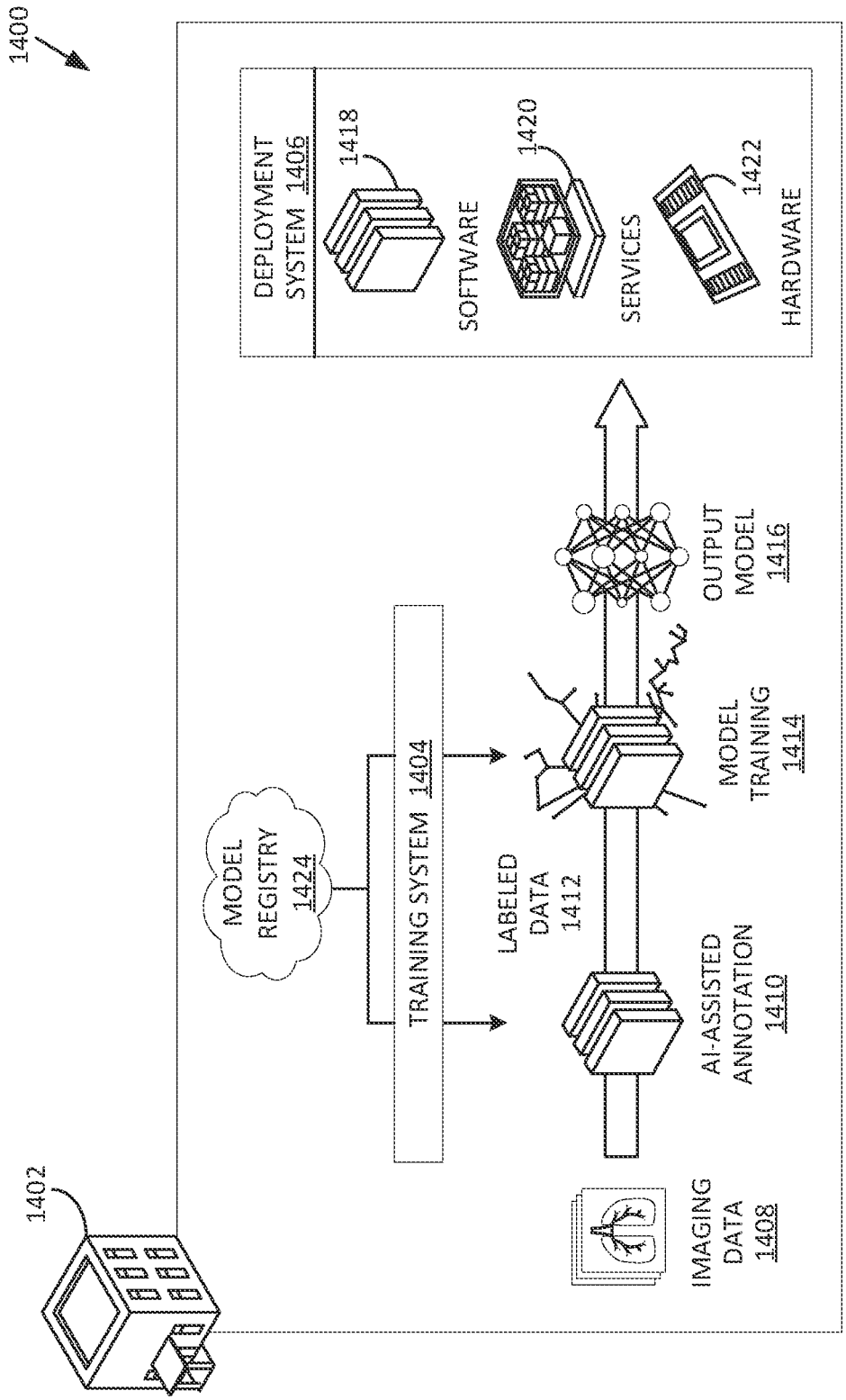
FIG. 14 is an example data flow diagram for an advanced computing pipeline, in accordance with at least one embodiment.

FIG. 14 is an example data flow diagram for a process 1400 of generating and deploying an image processing and inferencing pipeline, in accordance with at least one embodiment. In at least one embodiment, process 1400 may be deployed for use with imaging devices, processing devices, and/or other device types at one or more facilities 1402. Process 1400 may be executed within a training system 1404 and/or a deployment system 1406. In at least one embodiment, training system 1404 may be used to perform training, deployment, and implementation of machine learning models (e.g., neural networks, object detection algorithms, computer vision algorithms, etc.) for use in deployment system 1406. In at least one embodiment, deployment system 1406 may be configured to offload processing and compute resources among a distributed computing environment to reduce infrastructure requirements at facility 1402. In at least one embodiment, one or more applications in a pipeline may use or call upon services (e.g., inference, visualization, compute, AI, etc.) of deployment system 1406 during execution of applications.

In at least one embodiment, some of applications used in advanced processing and inferencing pipelines may use machine learning models or other AI to perform one or more processing steps. In at least one embodiment, machine learning models may be trained at facility 1402 using data 1408 (such as imaging data) generated at facility 1402 (and stored on one or more picture archiving and communication system (PACS) servers at facility 1402), may be trained using imaging or sequencing data 1408 from another facility (ies), or a combination thereof. In at least one embodiment, training system 1404 may be used to provide applications, services, and/or other resources for generating working, deployable machine learning models for deployment system 1406.

In at least one embodiment, model registry 1424 may be backed by object storage that may support versioning and object metadata. In at least one embodiment, object storage may be accessible through, for example, a cloud storage (e.g., cloud 1526 of FIG. 15) compatible application programming interface (API) from within a cloud platform. In at least one embodiment, machine learning models within model registry 1424 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1504 (FIG. 15) may include a scenario where facility 1402 is training their own machine learning model, or has an existing machine learning model that needs to be optimized or updated. In at least one embodiment, imaging data 1408 generated by imaging device(s), sequencing devices, and/or other device types may be received. In at least one embodiment, once imaging data 1408 is received, AI-assisted annotation 1410 may be used to aid in generating annotations corresponding to imaging data 1408 to be used as ground truth data for a machine learning model. In at least one embodiment, AI-assisted annotation 1410 may include one or more machine learning models (e.g., convolutional neural networks (CNNs)) that may be trained to generate annotations corresponding to certain types of imaging data 1408 (e.g., from certain devices). In at least one embodiment, AI-assisted annotations 1410 may then be used directly, or may be adjusted or fine-tuned using an annotation tool to generate ground truth data. In at least one embodiment, AI-assisted annotations 1410, labeled clinic data 1412, or a combination thereof may be used as ground truth data for training a machine learning model. In at least one embodiment, a trained machine learning model may be referred to as output model 1416, and may be used by deployment system 1406, as described herein.

In at least one embodiment, training pipeline 1504 (FIG. 15) may include a scenario where facility 1402 needs a machine learning model for use in performing one or more processing tasks for one or more applications in deployment system 1406, but facility 1402 may not currently have such a machine learning model (or may not have a model that is optimized, efficient, or effective for such purposes). In at least one embodiment, an existing machine learning model may be selected from a model registry 1424. In at least one embodiment, model registry 1424 may include machine learning models trained to perform a variety of different inference tasks on imaging data. In at least one embodiment, machine learning models in model registry 1424 may have been trained on imaging data from different facilities than facility 1402 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1424. In at least one embodiment, a machine learning model may then be retrained, or updated, at any number of other facilities, and a retrained or updated model may be made available in model registry 1424. In at least one embodiment, a machine learning model may then be selected from model registry 1424—and referred to as output model 1416—and may be used in deployment system 1406 to perform one or more processing tasks for one or more applications of a deployment system.

In at least one embodiment, training pipeline 1504 (FIG. 15), a scenario may include facility 1402 requiring a machine learning model for use in performing one or more processing tasks for one or more applications in deployment system 1406, but facility 1402 may not currently have such a machine learning model (or may not have a model that is optimized, efficient, or effective for such purposes). In at least one embodiment, a machine learning model selected from model registry 1424 may not be fine-tuned or optimized for imaging data 1408 generated at facility 1402 because of differences in populations, robustness of training data used to train a machine learning model, diversity in anomalies of training data, and/or other issues with training data. In at least one embodiment, AI-assisted annotation 1410 may be used to aid in generating annotations corresponding to imaging data 1408 to be used as ground truth data for retraining or updating a machine learning model. In at least one embodiment, labeled data 1412 may be used as ground truth data for training a machine learning model. In at least one embodiment, retraining or updating a machine learning model may be referred to as model training 1414. In at least one embodiment, model training 1414—e.g., AI-assisted annotations 1410, labeled clinic data 1412, or a combination thereof—may be used as ground truth data for retraining or updating a machine learning model. In at least one embodiment, a trained machine learning model may be referred to as output model 1416, and may be used by deployment system 1406, as described herein.

In at least one embodiment, deployment system 1406 may include software 1418, services 1420, hardware 1422, and/or other components, features, and functionality. In at least one embodiment, deployment system 1406 may include a software "stack," such that software 1418 may be built on top of services 1420 and may use services 1420 to perform some or all of processing tasks, and services 1420 and software 1418 may be built on top of hardware 1422 and use hardware 1422 to execute processing, storage, and/or other compute tasks of deployment system 1406. In at least one embodiment, software 1418 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1408, in addition to containers that receive and configure imaging data for use by each container and/or for use by facility 1402 after processing through a pipeline (e.g., to convert outputs back to a usable data type). In at least one embodiment, a combination of containers within software 1418 (e.g., that make up a pipeline) may be referred to as a virtual instrument (as described in more detail herein), and a virtual instrument may leverage services 1420 and hardware 1422 to execute some or all processing tasks of applications instantiated in containers.

In at least one embodiment, a data processing pipeline may receive input data (e.g., imaging data 1408) in a specific format in response to an inference request (e.g., a request from a user of deployment system 1406). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1416 of training system 1404.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1424 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1420 as a system (e.g., system 1500 of FIG. 15). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1500 (e.g., for accuracy), an application may be available in a container registry for selection and/or implementation by a user to perform one or more processing tasks with respect to data at a facility (e.g., a second facility) of a user.

Figure 15:
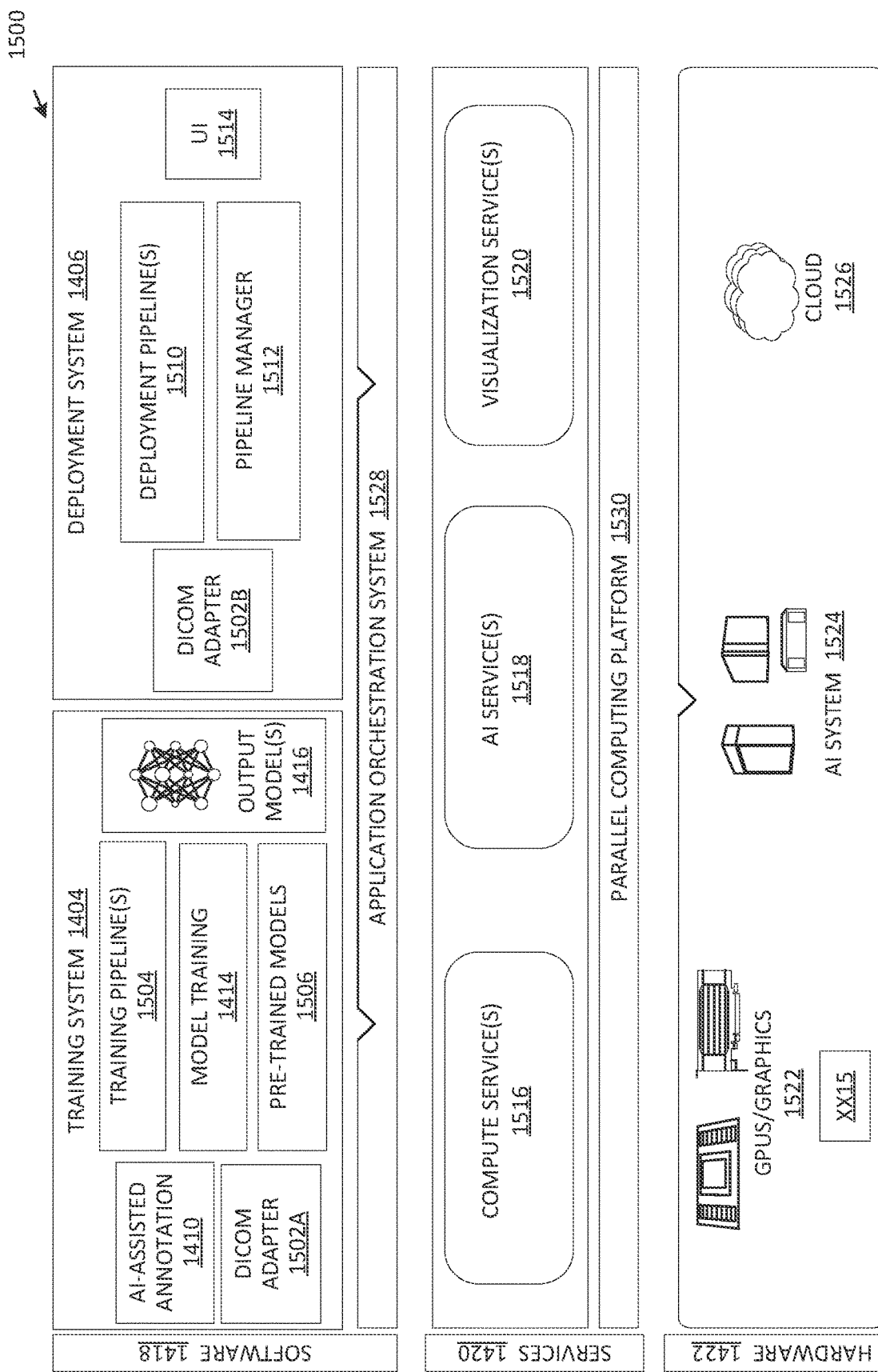
FIG. 15 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1500 of FIG. 15). In at least one embodiment, completed and validated applications or containers may be stored in a container registry and associated machine learning models may be stored in model registry 1424.

In at least one embodiment, a requesting entity-who provides an inference or image processing request—may browse a container registry and/or model registry 1424 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1406 (e.g., a cloud) to perform processing of data processing pipeline. In at least one embodiment, processing by deployment system 1406 may include referencing selected elements (e.g., applications, containers, models, etc.) from a container registry and/or model registry 1424. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1420 may be leveraged. In at least one embodiment, services 1420 may include compute services, artificial intelligence (AI) services, visualization services, and/or other service types. In at least one embodiment, services 1420 may provide functionality that is common to one or more applications in software 1418, so functionality may be abstracted to a service that may be called upon or leveraged by applications. In at least one embodiment, functionality provided by services 1420 may run dynamically and more efficiently, while also scaling well by allowing applications to process data in parallel (e.g., using a parallel computing platform 1530 (FIG. 15)). In at least one embodiment, rather than each application that shares a same functionality offered by a service 1420 being required to have a respective instance of service 1420, service 1420 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects-such as raytracing, rasterization, denoising, sharpening, etc.—to add realism to two-dimensional (2D) and/or three-dimensional (3D) models. In at least one embodiment, virtual instrument services may be included that provide for beamforming, segmentation, inferencing, imaging, and/or support for other applications within pipelines of virtual instruments.

In at least one embodiment, where a service 1420 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1418 implementing advanced processing and inferencing pipeline that includes segmentation application and anomaly detection application may be streamlined because each application may call upon a same inference service to perform one or more inferencing tasks.

In at least one embodiment, hardware 1422 may include GPUs, CPUs, DPUS, graphics cards, an AI/deep learning system (e.g., an AI supercomputer, such as NVIDIA's DGX), a cloud platform, or a combination thereof. In at least one embodiment, different types of hardware 1422 may be used to provide efficient, purpose-built support for software 1418 and services 1420 in deployment system 1406. In at least one embodiment, use of GPU processing may be implemented for processing locally (e.g., at facility 1402), within an AI/deep learning system, in a cloud system, and/or in other processing components of deployment system 1406 to improve efficiency, accuracy, and efficacy of image processing and generation. In at least one embodiment, software 1418 and/or services 1420 may be optimized for GPU processing with respect to deep learning, machine learning, and/or high-performance computing, as non-limiting examples. In at least one embodiment, at least some of computing environment of deployment system 1406 and/or training system 1404 may be executed in a datacenter one or more supercomputers or high performance computing systems, with GPU optimized software (e.g., hardware and software combination of NVIDIA's DGX System). In at least one embodiment, hardware 1422 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 15 is a system diagram for an example system 1500 for generating and deploying an imaging deployment pipeline, in accordance with at least one embodiment. In at least one embodiment, system 1500 may be used to implement process 1400 of FIG. 14 and/or other processes including advanced processing and inferencing pipelines. In at least one embodiment, system 1500 may include training system 1404 and deployment system 1406. In at least one embodiment, training system 1404 and deployment system 1406 may be implemented using software 1418, services 1420, and/or hardware 1422, as described herein.

In at least one embodiment, system 1500 (e.g., training system 1404 and/or deployment system 1406) may implemented in a cloud computing environment (e.g., using cloud 1526). In at least one embodiment, system 1500 may be implemented locally with respect to a healthcare services facility, or as a combination of both cloud and local computing resources. In at least one embodiment, access to APIs in cloud 1526 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1500, may be restricted to a set of public IPs that have been vetted or authorized for interaction.

In at least one embodiment, various components of system 1500 may communicate between and among one another using any of a variety of different network types, including but not limited to local area networks (LANs) and/or wide area networks (WANs) via wired and/or wireless communication protocols. In at least one embodiment, communication between facilities and components of system 1500 (e.g., for transmitting inference requests, for receiving results of inference requests, etc.) may be communicated over data bus (ses), wireless data protocols (Wi-Fi), wired data protocols (e.g., Ethernet), etc.

In at least one embodiment, training system 1404 may execute training pipelines 1504, similar to those described herein with respect to FIG. 14. In at least one embodiment, where one or more machine learning models are to be used in deployment pipelines 1510 by deployment system 1406, training pipelines 1504 may be used to train or retrain one or more (e.g., pre-trained) models, and/or implement one or more of pre-trained models 1506 (e.g., without a need for retraining or updating). In at least one embodiment, as a result of training pipelines 1504, output model(s) 1416 may be generated. In at least one embodiment, training pipelines 1504 may include any number of processing steps, such as but not limited to imaging data (or other input data) conversion or adaption In at least one embodiment, for different machine learning models used by deployment system 1406, different training pipelines 1504 may be used. In at least one embodiment, training pipeline 1504 similar to a first example described with respect to FIG. 14 may be used for a first machine learning model, training pipeline 1504 similar to a second example described with respect to FIG. 14 may be used for a second machine learning model, and training pipeline 1504 similar to a third example described with respect to FIG. 14 may be used for a third machine learning model. In at least one embodiment, any combination of tasks within training system 1404 may be used depending on what is required for each respective machine learning model. In at least one embodiment, one or more of machine learning models may already be trained and ready for deployment so machine learning models may not undergo any processing by training system 1404, and may be implemented by deployment system 1406.

In at least one embodiment, output model(s) 1416 and/or pre-trained model(s) 1506 may include any types of machine learning models depending on implementation or embodiment. In at least one embodiment, and without limitation, machine learning models used by system 1500 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 16A:
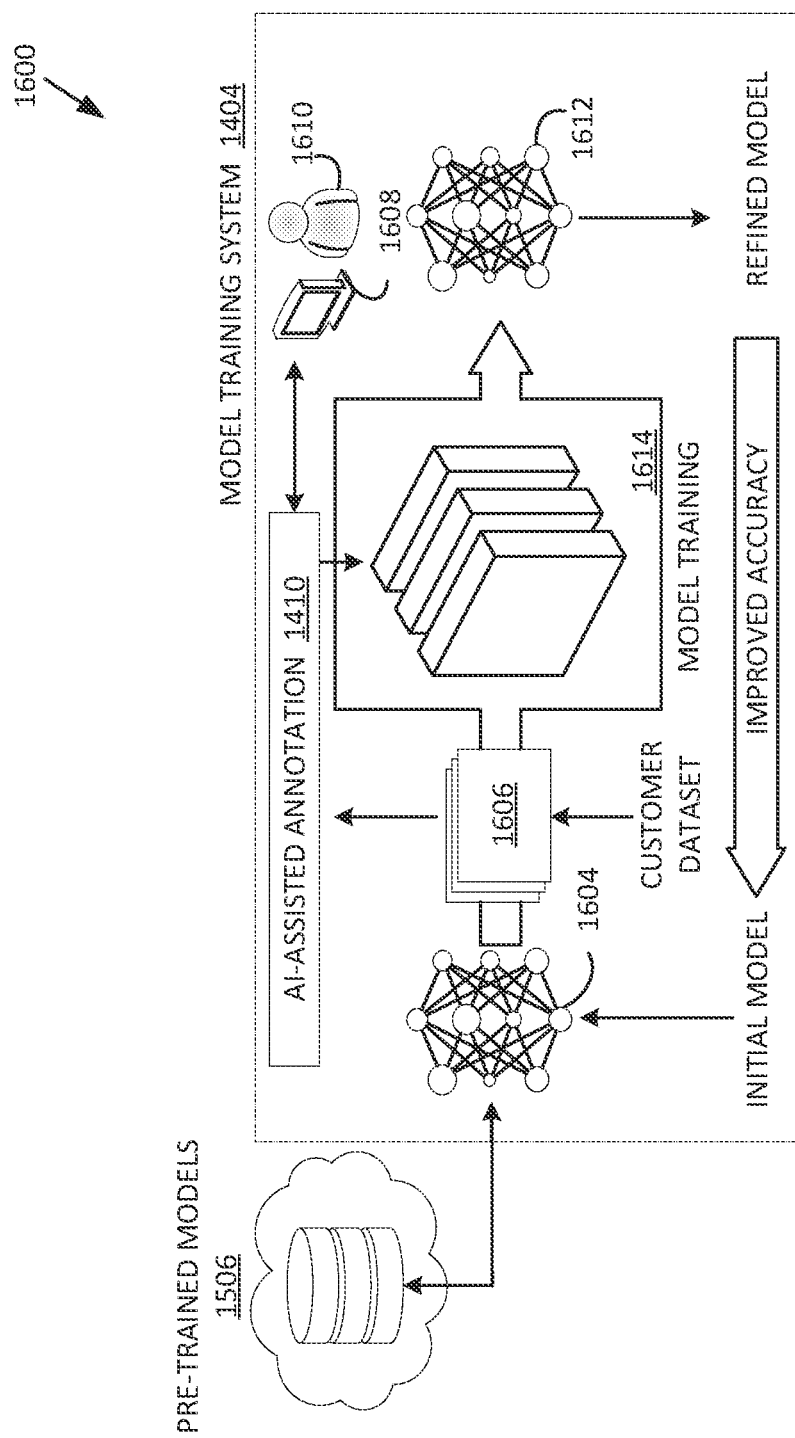
FIGS. 16A and 16B illustrate a data flow diagram for a process to train a machine learning model, as well as client-server architecture to enhance annotation tools with pre-trained annotation models, in accordance with at least one embodiment.
Figure 16B:
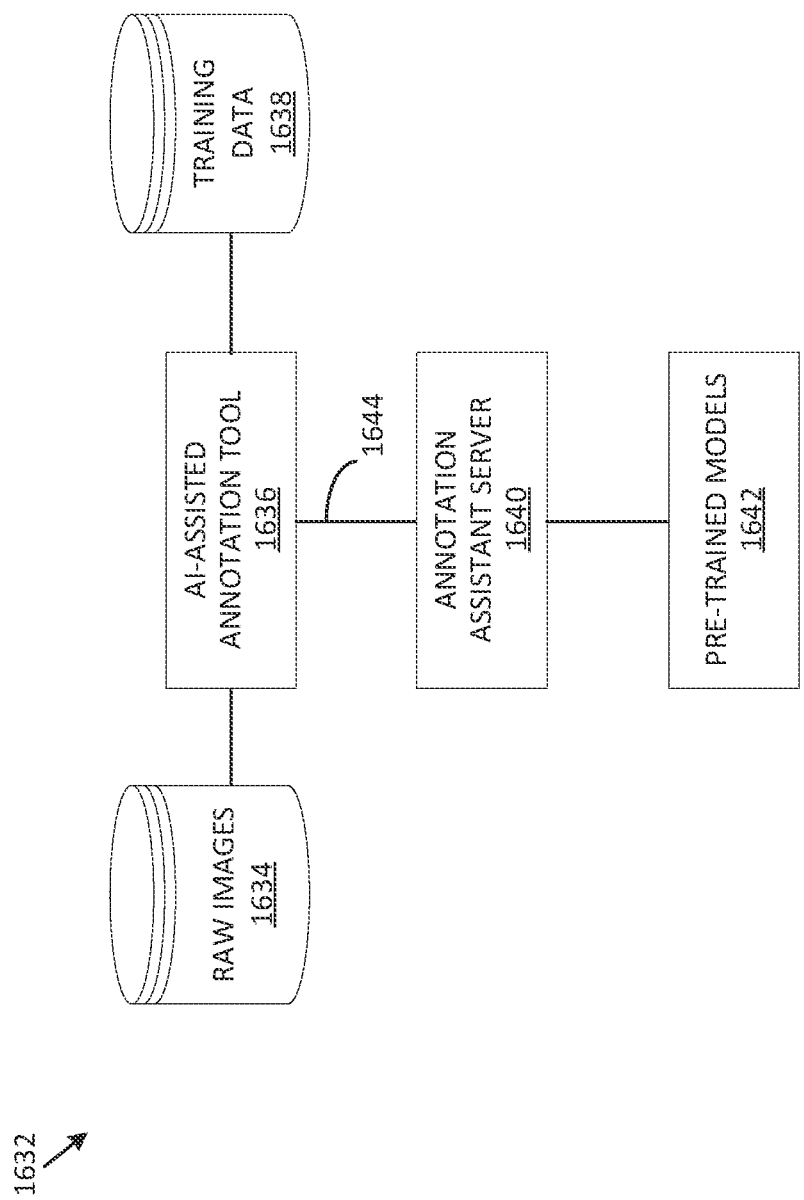

In at least one embodiment, training pipelines 1504 may include AI-assisted annotation, as described in more detail herein with respect to at least FIG. 16B. In at least one embodiment, labeled data 1412 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1408 (or other data type used by machine learning models), there may be corresponding ground truth data generated by training system 1404. In at least one embodiment, AI-assisted annotation may be performed as part of deployment pipelines 1510; either in addition to, or in lieu of AI-assisted annotation included in training pipelines 1504. In at least one embodiment, system 1500 may include a multi-layer platform that may include a software layer (e.g., software 1418) of diagnostic applications (or other application types) that may perform one or more medical imaging and diagnostic functions. In at least one embodiment, system 1500 may be communicatively coupled to (e.g., via encrypted links) PACS server networks of one or more facilities. In at least one embodiment, system 1500 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1402). In at least one embodiment, applications may then call or execute one or more services 1420 for performing compute, AI, or visualization tasks associated with respective applications, and software 1418 and/or services 1420 may leverage hardware 1422 to perform processing tasks in an effective and efficient manner.

In at least one embodiment, deployment system 1406 may execute deployment pipelines 1510. In at least one embodiment, deployment pipelines 1510 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1510 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1510 depending on information desired from data generated by a device. In at least one embodiment, where detections of anomalies are desired from an MRI machine, there may be a first deployment pipeline 1510, and where image enhancement is desired from output of an MRI machine, there may be a second deployment pipeline 1510.

In at least one embodiment, an image generation application may include a processing task that includes use of a machine learning model. In at least one embodiment, a user may desire to use their own machine learning model, or to select a machine learning model from model registry 1424. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1500—such as services 1420 and hardware 1422—deployment pipelines 1510 may be even more user friendly, provide for easier integration, and produce more accurate, efficient, and timely results.

In at least one embodiment, deployment system 1406 may include a user interface 1514 (e.g., a graphical user interface, a web interface, etc.) that may be used to select applications for inclusion in deployment pipeline(s) 1510, arrange applications, modify, or change applications or parameters or constructs thereof, use and interact with deployment pipeline(s) 1510 during set-up and/or deployment, and/or to otherwise interact with deployment system 1406. In at least one embodiment, although not illustrated with respect to training system 1404, user interface 1514 (or a different user interface) may be used for selecting models for use in deployment system 1406, for selecting models for training, or retraining, in training system 1404, and/or for otherwise interacting with training system 1404.

In at least one embodiment, pipeline manager 1512 may be used, in addition to an application orchestration system 1528, to manage interaction between applications or containers of deployment pipeline(s) 1510 and services 1420 and/or hardware 1422. In at least one embodiment, pipeline manager 1512 may be configured to facilitate interactions from application to application, from application to service 1420, and/or from application or service to hardware 1422. In at least one embodiment, although illustrated as included in software 1418, this is not intended to be limiting, and in some examples (e.g., as illustrated in FIG. 13) pipeline manager 1512 may be included in services 1420. In at least one embodiment, application orchestration system 1528 (e.g., Kubernetes, DOCKER, etc.) may include a container orchestration system that may group applications into containers as logical units for coordination, management, scaling, and deployment. In at least one embodiment, by associating applications from deployment pipeline(s) 1510 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1512 and application orchestration system 1528. In at least one embodiment, so long as an expected input and/or output of each container or application is known by a system (e.g., based on constructs of applications or containers), application orchestration system 1528 and/or pipeline manager 1512 may facilitate communication among and between, and sharing of resources among and between, each of applications or containers. In at least one embodiment, because one or more of applications or containers in deployment pipeline(s) 1510 may share same services and resources, application orchestration system 1528 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1528) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1420 leveraged by and shared by applications or containers in deployment system 1406 may include compute services 1516, AI services 1518, visualization services 1520, and/or other service types. In at least one embodiment, applications may call (e.g., execute) one or more of services 1420 to perform processing operations for an application. In at least one embodiment, compute services 1516 may be leveraged by applications to perform super-computing or other high-performance computing (HPC) tasks. In at least one embodiment, compute service(s) 1516 may be leveraged to perform parallel processing (e.g., using a parallel computing platform 1530) for processing data through one or more of applications and/or one or more tasks of a single application, substantially simultaneously. In at least one embodiment, parallel computing platform 1530 (e.g., NVIDIA's CUDA) may enable general purpose computing on GPUs (GPGPU) (e.g., GPUs 1522). In at least one embodiment, a software layer of parallel computing platform 1530 may provide access to virtual instruction sets and parallel computational elements of GPUs, for execution of compute kernels. In at least one embodiment, parallel computing platform 1530 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1530 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1518 may be leveraged to perform inferencing services for executing machine learning model(s) associated with applications (e.g., tasked with performing one or more processing tasks of an application). In at least one embodiment, AI services 1518 may leverage AI system 1524 to execute machine learning model(s) (e.g., neural networks, such as CNNs) for segmentation, reconstruction, object detection, feature detection, classification, and/or other inferencing tasks. In at least one embodiment, applications of deployment pipeline(s) 1510 may use one or more of output models 1416 from training system 1404 and/or other models of applications to perform inference on imaging data. In at least one embodiment, two or more examples of inferencing using application orchestration system 1528 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1528 may distribute resources (e.g., services 1420 and/or hardware 1422) based on priority paths for different inferencing tasks of AI services 1518.

In at least one embodiment, shared storage may be mounted to AI services 1518 within system 1500. In at least one embodiment, shared storage may operate as a cache (or other storage device type) and may be used to process inference requests from applications. In at least one embodiment, when an inference request is submitted, a request may be received by a set of API instances of deployment system 1406, and one or more instances may be selected (e.g., for best fit, for load balancing, etc.) to process a request. In at least one embodiment, to process a request, a request may be entered into a database, a machine learning model may be located from model registry 1424 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1512) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<11 min). In at least one embodiment, model execution times may be measured from requesting institution or entity and may include partner network traversal time, as well as execution on an inference service.

In at least one embodiment, transfer of requests between services 1420 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1526, and an inference service may perform inferencing on a GPU.

In at least one embodiment, visualization services 1520 may be leveraged to generate visualizations for viewing outputs of applications and/or deployment pipeline(s) 1510. In at least one embodiment, GPUs 1522 may be leveraged by visualization services 1520 to generate visualizations. In at least one embodiment, rendering effects, such as raytracing, may be implemented by visualization services 1520 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1520 may include an internal visualizer, cinematics, and/or other rendering or image processing capabilities or functionality (e.g., ray tracing, rasterization, internal optics, etc.).

In at least one embodiment, hardware 1422 may include GPUs 1522, AI system 1524, cloud 1526, and/or any other hardware used for executing training system 1404 and/or deployment system 1406. In at least one embodiment, GPUs 1522 (e.g., NVIDIA's TESLA and/or QUADRO GPUs) may include any number of GPUs that may be used for executing processing tasks of compute services 1516, AI services 1518, visualization services 1520, other services, and/or any of features or functionality of software 1418. For example, with respect to AI services 1518, GPUs 1522 may be used to perform pre-processing on imaging data (or other data types used by machine learning models), post-processing on outputs of machine learning models, and/or to perform inferencing (e.g., to execute machine learning models). In at least one embodiment, cloud 1526, AI system 1524, and/or other components of system 1500 may use GPUs 1522. In at least one embodiment, cloud 1526 may include a GPU-optimized platform for deep learning tasks. In at least one embodiment, AI system 1524 may use GPUs, and cloud 1526—or at least a portion tasked with deep learning or inferencing—may be executed using one or more AI systems 1524. As such, although hardware 1422 is illustrated as discrete components, this is not intended to be limiting, and any components of hardware 1422 may be combined with, or leveraged by, any other components of hardware 1422.

In at least one embodiment, AI system 1524 may include a purpose-built computing system (e.g., a super-computer or an HPC) configured for inferencing, deep learning, machine learning, and/or other artificial intelligence tasks. In at least one embodiment, AI system 1524 (e.g., NVIDIA's DGX) may include GPU-optimized software (e.g., a software stack) that may be executed using a plurality of GPUs 1522, in addition to DPUs, CPUs, RAM, storage, and/or other components, features, or functionality. In at least one embodiment, one or more AI systems 1524 may be implemented in cloud 1526 (e.g., in a data center) for performing some or all of AI-based processing tasks of system 1500.

In at least one embodiment, cloud 1526 may include a GPU-accelerated infrastructure (e.g., NVIDIA's NGC) that may provide a GPU-optimized platform for executing processing tasks of system 1500. In at least one embodiment, cloud 1526 may include an AI system(s) 1524 for performing one or more of AI-based tasks of system 1500 (e.g., as a hardware abstraction and scaling platform). In at least one embodiment, cloud 1526 may integrate with application orchestration system 1528 leveraging multiple GPUs to enable seamless scaling and load balancing between and among applications and services 1420. In at least one embodiment, cloud 1526 may tasked with executing at least some of services 1420 of system 1500, including compute services 1516, AI services 1518, and/or visualization services 1520, as described herein. In at least one embodiment, cloud 1526 may perform small and large batch inference (e.g., executing NVIDIA's TENSOR RT), provide an accelerated parallel computing API and platform 1530 (e.g., NVIDIA's CUDA), execute application orchestration system 1528 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1500.

FIG. 16A illustrates a data flow diagram for a process 1600 to train, retrain, or update a machine learning model, in accordance with at least one embodiment. In at least one embodiment, process 1600 may be executed using, as a non-limiting example, system 1500 of FIG. 15. In at least one embodiment, process 1600 may leverage services 1420 and/or hardware 1422 of system 1500, as described herein. In at least one embodiment, refined models 1612 generated by process 1600 may be executed by deployment system 1406 for one or more containerized applications in deployment pipelines 1510.

In at least one embodiment, model training 1414 may include retraining or updating an initial model 1604 (e.g., a pre-trained model) using new training data (e.g., new input data, such as customer dataset 1606, and/or new ground truth data associated with input data). In at least one embodiment, to retrain, or update, initial model 1604, output or loss layer(s) of initial model 1604 may be reset, or deleted, and/or replaced with an updated or new output or loss layer(s). In at least one embodiment, initial model 1604 may have previously fine-tuned parameters (e.g., weights and/or biases) that remain from prior training, so training or retraining 1414 may not take as long or require as much processing as training a model from scratch. In at least one embodiment, during model training 1414, by having reset or replaced output or loss layer(s) of initial model 1604, parameters may be updated and re-tuned for a new data set based on loss calculations associated with accuracy of output or loss layer(s) at generating predictions on new, customer dataset 1606 (e.g., image data 1408 of FIG. 14).

In at least one embodiment, pre-trained models 1506 may be stored in a data store, or registry (e.g., model registry 1424 of FIG. 14). In at least one embodiment, pre-trained models 1506 may have been trained, at least in part, at one or more facilities other than a facility executing process 1600. In at least one embodiment, to protect privacy and rights of patients, subjects, or clients of different facilities, pre-trained models 1506 may have been trained, on-premise, using customer or patient data generated on-premise. In at least one embodiment, pre-trained models 1506 may be trained using cloud 1526 and/or other hardware 1422, but confidential, privacy protected patient data may not be transferred to, used by, or accessible to any components of cloud 1526 (or other off premise hardware). In at least one embodiment, where a pre-trained model 1506 is trained at using patient data from more than one facility, pre-trained model 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1506 on-premise and/or off premise, such as in a datacenter or other cloud computing infrastructure.

In at least one embodiment, when selecting applications for use in deployment pipelines 1510, a user may also select machine learning models to be used for specific applications. In at least one embodiment, a user may not have a model for use, so a user may select a pre-trained model 1506 to use with an application. In at least one embodiment, pre-trained model 1506 may not be optimized for generating accurate results on customer dataset 1606 of a facility of a user (e.g., based on patient diversity, demographics, types of medical imaging devices used, etc.). In at least one embodiment, prior to deploying pre-trained model 1506 into deployment pipeline 1510 for use with an application(s), pre-trained model 1506 may be updated, retrained, and/or fine-tuned for use at a respective facility.

In at least one embodiment, a user may select pre-trained model 1506 that is to be updated, retrained, and/or fine-tuned, and pre-trained model 1506 may be referred to as initial model 1604 for training system 1404 within process 1600. In at least one embodiment, customer dataset 1606 (e.g., imaging data, genomics data, sequencing data, or other data types generated by devices at a facility) may be used to perform model training 1414 (which may include, without limitation, transfer learning) on initial model 1604 to generate refined model 1612. In at least one embodiment, ground truth data corresponding to customer dataset 1606 may be generated by training system 1404. In at least one embodiment, ground truth data may be generated, at least in part, by clinicians, scientists, doctors, practitioners, at a facility (e.g., as labeled clinic data 1412 of FIG. 14).

In at least one embodiment, AI-assisted annotation 1410 may be used in some examples to generate ground truth data. In at least one embodiment, AI-assisted annotation 1410 (e.g., implemented using an AI-assisted annotation SDK) may leverage machine learning models (e.g., neural networks) to generate suggested or predicted ground truth data for a customer dataset. In at least one embodiment, user 1610 may use annotation tools within a user interface (a graphical user interface (GUI)) on computing device 1608.

In at least one embodiment, user 1610 may interact with a GUI via computing device 1608 to edit or fine-tune (auto) annotations. In at least one embodiment, a polygon editing feature may be used to move vertices of a polygon to more accurate or fine-tuned locations.

In at least one embodiment, once customer dataset 1606 has associated ground truth data, ground truth data (e.g., from AI-assisted annotation, manual labeling, etc.) may be used by during model training 1414 to generate refined model 1612. In at least one embodiment, customer dataset 1606 may be applied to initial model 1604 any number of times, and ground truth data may be used to update parameters of initial model 1604 until an acceptable level of accuracy is attained for refined model 1612. In at least one embodiment, once refined model 1612 is generated, refined model 1612 may be deployed within one or more deployment pipelines 1510 at a facility for performing one or more processing tasks with respect to medical imaging data.

In at least one embodiment, refined model 1612 may be uploaded to pre-trained models 1506 in model registry 1424 to be selected by another facility. In at least one embodiment, his process may be completed at any number of facilities such that refined model 1612 may be further refined on new datasets any number of times to generate a more universal model.

FIG. 16B is an example illustration of a client-server architecture 1632 to enhance annotation tools with pre-trained annotation models, in accordance with at least one embodiment. In at least one embodiment, AI-assisted annotation tools 1636 may be instantiated based on a client-server architecture 1632. In at least one embodiment, annotation tools 1636 in imaging applications may aid radiologists, for example, identify organs and abnormalities. In at least one embodiment, imaging applications may include software tools that help user 1610 to identify, as a non-limiting example, a few extreme points on a particular organ of interest in raw images 1634 (e.g., in a 3D MRI or CT scan) and receive auto-annotated results for all 2D slices of a particular organ. In at least one embodiment, results may be stored in a data store as training data 1638 and used as (for example and without limitation) ground truth data for training. In at least one embodiment, when computing device 1608 sends extreme points for AI-assisted annotation 1410, a deep learning model, for example, may receive this data as input and return inference results of a segmented organ or abnormality. In at least one embodiment, pre-instantiated annotation tools, such as AI-Assisted Annotation Tool 1636B in FIG. 16B, may be enhanced by making API calls (e.g., API Call 1644) to a server, such as an Annotation Assistant Server 1640 that may include a set of pre-trained models 1642 stored in an annotation model registry, for example. In at least one embodiment, an annotation model registry may store pre-trained models 1642 (e.g., machine learning models, such as deep learning models) that are pre-trained to perform AI-assisted annotation on a particular organ or abnormality. These models may be further updated by using training pipelines 1504. In at least one embodiment, pre-installed annotation tools may be improved over time as new labeled clinic data 1412 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving, by a processing device associated with an open domain dialog system, a first user query associated with a first privacy status;
   obtaining, by the processing device, a response to the first user query based on an output of one or more machine learning models associated with the open domain dialog system, wherein each of the one or more machine learning models are trained to predict responses to user queries associated with the first privacy status;
   providing, by the processing device and in view of the first privacy status, data associated with the first user query and the obtained response as training data to train the one or more machine learning models;
   receiving, by the processing device, a second user query associated with a second privacy status;
   identifying, by the processing device, a closed domain dialog system associated with a context of the second user query, wherein the closed domain dialog system has a third privacy status corresponding to the second privacy status of the second user query; and
   forwarding, by the processing device, the second user query to the closed domain dialog system for obtaining a response to the second user query, wherein data associated with the second user query is not provided as training data to train the one or more machine learning models associated with the open domain dialog system.

2. The method of claim 1, wherein the first privacy status and the second privacy status correspond to privacy conditions pertaining to at least one of:
   one or more organizations associated with user devices that transmitted the first user query and the second user query,
   one or more geographic locations associated with the user devices that transmitted the first user query and the second user query,
   a task type associated with one or more tasks pertaining to the first user query and the second user query, or
   a data type associated with one or more data items accessed to perform the one or more tasks pertaining to the first user query and the second user query.

3. The method of claim 2, wherein the first user query is received from a first user device and the second user query is received from a second user device, and wherein the second user device is associated with one or more privacy conditions pertaining to an organization associated with the second user device.

4. The method of claim 2, wherein the first user query and the second user query are received from a first user device, and wherein the first user query corresponds to at least one of a first task having a first task type or first data having a first data type, and wherein the second user query corresponds to at least one of a second task having a second task type or second data having a second data type.

5. The method of claim 1, wherein the first user query and the second user query are received responsive to a single interaction of a user with the open domain dialog system.

6. The method of claim 5, further comprising:
   receiving a response to the second user query from an additional processing device associated with the closed domain dialog system; and
   providing the response to the first user query and the response to the second user query to a user device associated with the user.

7. The method of claim 6, wherein the response to the second user query received from the additional processing device is encrypted using encryption data that is unavailable to the processing device associated with the open domain dialog system and is available to the user device.

8. The method of claim 1, wherein the first user query and the second user query comprise at least one of textual data, audio data, or video data.

9. The method of claim 1, wherein the one or more machine learning models associated with the open domain dialog system comprise a large language model.

10. A system comprising:
a memory device; and
a processing device coupled to the memory device, the processing device to perform operations comprising:
receiving a first user query associated with a first privacy status;
obtaining a response to the first user query based on an output of one or more machine learning models associated with an open domain dialog system, wherein each of the one or more machine learning models are trained to predict responses to user queries associated with the first privacy status;
providing, in view of the first privacy status, data associated with the first user query and the obtained response as training data to train the one or more machine learning models;
receiving a second user query associated with a second privacy status;
identifying a closed domain dialog system associated with a context of the second user query, wherein the closed domain dialog system has a third privacy status corresponding to the second privacy status of the second user query; and
forwarding the second user query to the closed domain dialog system for obtaining a response to the second user query, wherein data associated with the second user query is not provided as training data to train the one or more machine learning models associated with the open domain dialog system.

11. The system of claim 10, wherein the first privacy status and the second privacy status correspond to privacy conditions pertaining to at least one of:
one or more organizations associated with user devices that transmitted the first user query and the second user query,
one or more geographic locations associated with the user devices that transmitted the first user query and the second user query,
a task type associated with one or more tasks pertaining to the first user query and the second user query, or
a data type associated with one or more data items accessed to perform the one or more tasks pertaining to the first user query and the second user query.

12. The system of claim 11, wherein the first user query is received from a first user device and the second user query is received from a second user device, and wherein the second user device is associated with one or more privacy conditions pertaining to an organization associated with the second user device.

13. The system of claim 11, wherein the first user query and the second user query are received from a first user device, and wherein the first user query corresponds to at least one of a first task having a first task type or first data having a first data type, and wherein the second user query corresponds to at least one of a second task having a second task type or second data having a second data type.

14. The system of claim 10, wherein the first user query and the second user query are received responsive to a single interaction of a user with the open domain dialog system.

15. The system of claim 14, wherein the operations further comprise:
receiving a response to the second user query from an additional processing device associated with the closed domain dialog system; and
providing the response to the first user query and the response to the second user query to a user device associated with the user.

16. A non-transitory computer readable storage medium comprising instructions for a server that, when executed by a processing device, cause the processing device to perform operations comprising:
receiving a first user query associated with a first privacy status;
obtaining a response to the first user query based on an output of one or more machine learning models associated with an open domain dialog system, wherein each of the one or more machine learning models are trained to predict responses to user queries associated with the first privacy status;
providing, in view of the first privacy status, data associated with the first user query and the obtained response as training data to train the one or more machine learning models;
receiving a second user query associated with a second privacy status;
identifying a closed domain dialog system associated with a context of the second user query, wherein the closed domain dialog system has a third privacy status corresponding to the second privacy status of the second user query; and
forwarding the second user query to the closed domain dialog system for obtaining a response to the second user query, wherein data associated with the second user query is not provided as training data to train the one or more machine learning models associated with the open domain dialog system.

17. The non-transitory computer readable storage medium of claim 16, wherein the first privacy status and the second privacy status correspond to privacy conditions pertaining to at least one of:
one or more organizations associated with user devices that transmitted the first user query and the second user query,
one or more geographic locations associated with the user devices that transmitted the first user query and the second user query,
a task type associated with one or more tasks pertaining to the first user query and the second user query, or
a data type associated with one or more data items accessed to perform the one or more tasks pertaining to the first user query and the second user query.

18. The non-transitory computer readable storage medium of claim 17, wherein the first user query is received from a first user device and the second user query is received from a second user device, and wherein the second user device is associated with one or more privacy conditions pertaining to an organization associated with the second user device.

19. The non-transitory computer readable storage medium of claim 17, wherein the first user query and the second user query are received from a first user device, and wherein the first user query corresponds to at least one of a first task having a first task type or first data having a first data type, and wherein the second user query corresponds to at least one of a second task having a second task type or second data having a second data type.

20. The non-transitory computer readable storage medium of claim 16, wherein the first user query and the second user query are received responsive to a single interaction of a user with the open domain dialog system.

* * * * *